US012626492B2

(12) United States Patent
Guo et al.

(10) Patent No.: US 12,626,492 B2
(45) Date of Patent: May 12, 2026

(54) PERCEPTION NETWORK AND DATA PROCESSING METHOD

(71) Applicant: HUAWEI TECHNOLOGIES CO., LTD., Shenzhen (CN)

(72) Inventors: Jianyuan Guo, Beijing (CN); Kai Han, Beijing (CN); Yunhe Wang, Beijing (CN); Chunjing Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 18/456,312

(22) Filed: Aug. 25, 2023

(65) Prior Publication Data

US 2023/0401826 A1    Dec. 14, 2023

Related U.S. Application Data

(63) Continuation of application No. PCT/CN2022/077881, filed on Feb. 25, 2022.

(30) Foreign Application Priority Data

Feb. 27, 2021    (CN) .......................... 202110221934.8

(51) Int. Cl.
*G06V 10/82* (2022.01)
*G06V 10/77* (2022.01)
*G06V 10/80* (2022.01)

(52) U.S. Cl.
CPC ........ *G06V 10/7715* (2022.01); *G06V 10/806* (2022.01); *G06V 10/82* (2022.01)

(58) Field of Classification Search
CPC .......................... G06V 10/7715; G06V 10/806
See application file for complete search history.

(56) References Cited

U.S. PATENT DOCUMENTS

2019/0355126 A1    11/2019  Sun et al.

FOREIGN PATENT DOCUMENTS

| CN | 107704866 A | 2/2018 |
| CN | 109583517 A | 4/2019 |
| CN | 110263705 A | 9/2019 |

(Continued)

OTHER PUBLICATIONS

Zhang et al. "Shufflenet: An extremely efficient convolutional neural network for mobile devices;" Proceedings of the IEEE conference on computer vision and pattern recognition; (Year: 2018).*

(Continued)

*Primary Examiner* — Sumati Lefkowitz
*Assistant Examiner* — Michael Adam Shariff
(74) *Attorney, Agent, or Firm* — Fish & Richardson P.C.

(57) ABSTRACT

This disclosure discloses methods, apparatuses, and systems related to perception networks. In an implementation, a method comprises: performing convolution processing on input data to obtain M target feature maps, performing convolution processing on M1 target feature maps in the M target feature maps to obtain M1 first feature maps, wherein M1 is less than M, processing M2 target feature maps in the M target feature maps to obtain M2 second feature maps, wherein M2 is less than M, and concatenating the M1 first feature maps and the M2 second feature maps to obtain a concatenated feature map.

21 Claims, 22 Drawing Sheets

(56) References Cited

FOREIGN PATENT DOCUMENTS

| CN | 110298262 | A | 10/2019 |
|----|-----------|---|---------|
| CN | 110765886 | A | 2/2020 |
| CN | 112396002 | A | 2/2021 |
| CN | 113065637 | A | 7/2021 |
| CN | 109086779 | B | 11/2021 |
| WO | 2021018245 | A1 | 2/2021 |

OTHER PUBLICATIONS

Howard et al., "MobileNets: Efficient Convolutional Neural Networks for Mobile Vision Applications," CoRR, arXiv:1704.04861v1, Apr. 17, 2017, 9 pages.

Larsson et al., "FractalNet: Ultra-Deep Neural Networks Without Residuals," CoRR, arXiv:1605.07648v4, May 26, 2017, 11 pages.

Sandler et al., "MobileNetV2: Inverted Residuals and Linear Bottlenecks," Proceedings of the IEEE conference on computer vision and pattern recognition, Dec. 2018, 11 pages.

Huang et al., "Densely Connected Convolutional Networks," Proceedings of the IEEE conference on computer vision and pattern recognition, Jul. 2017, 9 pages.

Howard et al., "Searching for MobileNetV3," Proceedings of the IEEE International Conference on Computer Vision, May 2019, 11 pages.

Zhang et al., "ShuffleNet: An Extremely Efficient Convolutional Neural Network for Mobile Devices," Proceedings of the IEEE conference on computer vision and pattern recognition, Jun. 2018, 9 pages.

Ma et al., "ShuffleNet V2: Practical Guidelines for Efficient CNN Architecture Design," Proceedings of the European conference on computer vision (ECCV), Sep. 2018, 16 pages.

Tan et al., "EfficientNet: Rethinking Model Scaling for Convolutional Neural Networks," International conference on machine learning, May 24, 2019, 10 pages.

Han et al., "GhostNet: More Features from Cheap Operations," Proceedings of the IEEE/CVF Conference on Computer Vision and Pattern Recognition, Aug. 2020, 10 pages.

* cited by examiner

1500

1501

Obtaining module

1502

Convolution processing module

1503

Concatenation module

1600

Execution device

Antenna

Antenna

Receiver 1601

Transmitter 1602

Memory 1604

Processor 1603

Application processor 16031

Communication processor 16032

PERCEPTION NETWORK AND DATA PROCESSING METHOD

CROSS-REFERENCE TO RELATED APPLICATIONS

This application is a continuation of International Application No. PCT/CN2022/077881, filed on Feb. 25, 2022, which claims priority to Chinese Patent Application No. 202110221934.8, filed on Feb. 27, 2021. The disclosures of the aforementioned applications are hereby incorporated by reference in their entireties.

TECHNICAL FIELD

This disclosure relates to the artificial intelligence field, and in particular, to a perception network and a data processing method.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result based on the knowledge. In other words, artificial intelligence is a branch of computer science and attempts to understand essence of intelligence and produce a new intelligent machine that can react in a manner similar to human intelligence. Artificial intelligence is to research design principles and implementation methods of various intelligent machines, so that the machines have perception, inference, and decision-making functions.

Computer vision is an integral part of various intelligent/ autonomic systems in various application fields such as manufacturing, inspection, document analysis, medical diagnosis, and military affairs. Computer vision is knowledge about how to use a camera/video camera and a computer to obtain required data and information of a photographed subject. To be vivid, an eye (the camera/video camera) and a brain (an algorithm) are installed on the computer to replace a human eye to recognize, track, and measure a target, and the like, so that the computer can perceive an environment. Perceiving may be considered as extracting information from a perceptual signal. Therefore, computer vision may also be considered as science of studying how to make an artificial system perceive an image or multi-dimensional data. Generally, computer vision is to replace a visual organ with various imaging systems to obtain input information, and then replace a brain with a computer to process and interpret the input information. A final study objective of computer vision is to enable a computer to observe and understand the world through vision like a human being does, and have a capability of automatically adapting to an environment.

An inference model based on a convolutional neural network is widely applied to various terminal tasks based on computer vision, for example, scenarios such as image recognition, target detection, and instance segmentation. In a conventional basic neural network, various terminal tasks usually cannot be carried out in real time due to a large quantity of parameters and a large amount of calculation. An existing lightweight inference network (for example, mobilenet, efficientnet, or shufflenet) is designed for a mobile device such as a central processing unit (CPU) or an ARM (advanced RISC machine), but has satisfactory performance on a processing unit designed based on a large throughput, for example, a graphics processing unit (GPU) device, a tensor processing unit (TPU) device, or a neural network processing unit (NPU) device, and an inference speed is even slower than that of a conventional convolutional neural network.

SUMMARY

According to a first aspect, this disclosure provides a perception network. The perception network includes a feature extraction network, the feature extraction network includes a first block, at least one second block connected in series, a target operation, and a concatenation operation, the first block and M second blocks are blocks in a same stage in the feature extraction network, and a quantity of parameters of the target operation is less than a quantity of parameters of the M second blocks.

The target operation may also be referred to as a cheap operation, may be a general term of a series of operations with a small quantity of parameters, and is used to be distinguished from a conventional convolution operation. The quantity of parameters may be used to describe a quantity of parameters included in a neural network, and is used to evaluate a size of a model.

The concatenation operation (concat) is to concatenate feature maps without changing data of the feature maps. For example, a result of performing a concatenation operation on a feature map 1 and a feature map 2 is (Feature map 1, Feature map 2). A sequence of the feature map 1 and the feature map 2 is not limited. More specifically, a result of performing a concatenation operation on a feature map having three semantic channels and a feature map having five semantic channels is a feature map having eight semantic channels.

The first block is configured to perform convolution processing on input data, to obtain M target feature maps. Each target feature map corresponds to one channel.

The at least one second block is configured to perform convolution processing on M1 target feature maps in the M target feature maps, to obtain M1 first feature maps, where M1 is less than M.

The target operation is used to process M2 target feature maps in the M target feature maps, to obtain M2 second feature maps, where M2 is less than M.

The concatenation operation is used to concatenate the M1 first feature maps and the M2 second feature maps, to obtain a concatenated feature map.

Output features of different blocks in a same stage of the feature extraction network have a high similarity, but output features of blocks in different stages have a low similarity. Therefore, in this embodiment of this disclosure, a cross-layer target operation in a same stage is used to enable the perception network to generate a feature that has a high similarity to a key feature, to reduce a quantity of parameters of a model, and improve a running speed of a model on a GPU device, a TPU device, and an NPU device.

This embodiment of this disclosure provides the perception network. The perception network includes the feature extraction network. The feature extraction network includes the first block, the at least one second block connected in series, the target operation, and the concatenation operation. The first block and M second blocks are blocks in a same stage in the feature extraction network, and the quantity of parameters of the target operation is less than the quantity of parameters of the M second blocks. The first block is configured to perform convolution processing on the input data, to obtain the M target feature maps. Each target feature map corresponds to one channel. The at least one second block is configured to perform convolution processing on the M1 target feature maps in the M target feature maps, to obtain the M1 first feature maps, where M1 is less than M. The target operation is used to process the M2 target feature maps in the M target feature maps, to obtain the M2 second feature maps, where M2 is less than M. The concatenation operation is used to concatenate the M1 first feature maps and the M2 second feature maps, to obtain the concatenated feature map. In the foregoing manner, the cross-layer target operation in a same stage is used to enable the perception network to generate the feature that has a high similarity to the key feature, to reduce the quantity of parameters of the model, and improve the running speed of the model on the GPU device, the TPU device, and the NPU device.

In a possible implementation, an intersection set of the M1 target feature maps and the M2 target feature maps is empty, a sum of M1 and M2 is M, and a quantity of channels of the concatenated feature map is M.

It is equivalent to that an output feature map of the at least one second block is a part of the target feature map output by the first block, or a quantity of channels of an output feature map of the at least one second block is a part of a quantity of channels of the target feature map output by the first block, and a target feature map of a remaining part of channels is processed by using the target operation. In addition, because the quantity of parameters of the target operation is less than a quantity of parameters of the at least one second block, an overall quantity of parameters of the perception network is reduced, and a running speed of the perception network on the GPU device, the TPU device, and the NPU device can be improved.

In a possible implementation, the target operation is a convolution operation whose quantity of parameters is less than a quantity of parameters of the at least one second block; or the target operation is a residual connection operation between an output of the first block and an output of the concatenation operation.

For example, the target operation is a 1×1 convolution, or the target operation is a residual connection operation between an output of the first block and an output of the concatenation operation. It is equivalent to that the M2 second feature maps are the M1 first feature maps. In other words, the M1 first feature maps are directly used as the M2 second feature maps.

It should be understood that an output feature map of the first block may be further split into a plurality of groups of feature maps, and a plurality of target operations are used to process one group of feature maps, provided that a sum of a quantity of channels of a feature map output by using each target operation and a quantity of channels of a feature map output by the at least one second block is the same as a quantity of channels of a feature map output by the first block. Quantities of channels of feature maps output by using different target operations may be different.

In a possible implementation, the at least one second block is configured to perform convolution processing on the M1 target feature maps in the M target feature maps, to obtain a feature map output by each second block, where an output of a second block that is farthest from the first block in the at least one second block is the M1 first feature maps;

the feature extraction network further includes:
a fusion operation, used to fuse the feature map output by each second block, to obtain a fused feature map, where a size of the fused feature map is the same as a size of the M2 second feature maps;

an addition operation is performed on the fused feature map and the M2 second feature maps, to obtain processed M2 second feature maps; and the concatenation operation is used to concatenate the M1 first feature maps and the processed M2 second feature maps, to obtain the concatenated feature map.

A concatenation operation may be performed on the feature map output by each second block, to obtain the concatenated feature map (a quantity of channels is a sum of feature maps output by each second block). Because a quantity of channels of the concatenated feature map is greater than a quantity (M2) of channels of a feature map output by using the target operation, to perform an addition operation on the concatenated feature map and an output (M2 second feature maps) of the target operation, a dimension reduction operation needs to be performed on the concatenated feature map, so that a quantity of channels of the concatenated feature map is equal to M2, and a matrix addition operation may be performed on the concatenated feature map and the output of the target operation.

In a possible implementation, the fusion operation is used to perform concatenation and dimension reduction operations on an output of each second block, to obtain the fused feature map whose size is same as the size of the M2 second feature maps.

In a possible implementation, the first block and the M second blocks are blocks in a target stage in the feature extraction network, and the concatenated feature map is used as an output feature map of the target stage in the feature extraction network; or the target stage further includes at least one third block, and the at least one third block is configured to perform a convolution operation on the concatenated feature map, to obtain an output feature map of the target stage.

In this embodiment of this disclosure, the concatenated feature map may be used as an output feature map of the target stage, or the concatenated feature map may be further processed by another block (the third block) included in the target stage, and the concatenated feature map may be further processed by the at least one third block, to obtain the output feature map of the target stage.

In a possible implementation, the first block may be a Pt block in the feature extraction network, or a block at an intermediate layer, and at least one third block may be further connected before the first block. In this case, the first block is configured to perform convolution processing on data output by the at least one third block.

In a possible implementation, the feature extraction network is configured to: obtain an input image, perform feature extraction on the input image, and output a feature map of the input image; and the perception network further includes:
a task network, configured to process a corresponding task based on the feature map of the input image, to obtain a processing result.

In a possible implementation, the task includes target detection, image segmentation, or image classification.

According to a second aspect, this disclosure provides a data processing method. The method includes:

obtaining a feature extraction network, where the feature extraction network includes a first block, at least one second block connected in series, a target operation, and a concatenation operation, the first block and M second blocks are blocks in a same stage in the feature extraction network, and a quantity of parameters of the target operation is less than a quantity of parameters of the M second blocks;

performing convolution processing on input data by using the first block, to obtain M target feature maps, where each target feature map corresponds to one channel;

performing convolution processing on M1 target feature maps in the M target feature maps by using the at least one second block, to obtain M1 first feature maps, where M1 is less than M;

processing M2 target feature maps in the M target feature maps by using the target operation, to obtain M2 second feature maps, where M2 is less than M; and concatenating the M1 first feature maps and the M2 second feature maps by using the concatenation operation, to obtain a concatenated feature map.

In a possible implementation, an intersection set of the M1 target feature maps and the M2 target feature maps is empty, a sum of M1 and M2 is M, and a quantity of channels of the concatenated feature map is M.

In a possible implementation, the target operation is a convolution operation whose quantity of parameters is less than a quantity of parameters of the at least one second block; or the target operation is a residual connection operation between an output of the first block and an output of the concatenation operation.

In a possible implementation, the at least one second block is configured to perform convolution processing on the M1 target feature maps in the M target feature maps, to obtain a feature map output by each second block, where an output of a second block that is farthest from the first block in the at least one second block is the M1 first feature maps;

the method further includes:

fusing the feature map output by each second block by using a fusion operation, to obtain a fused feature map, where a size of the fused feature map is the same as a size of the M2 second feature maps; and performing an addition operation on the fused feature map and the M2 second feature maps, to obtain processed M2 second feature maps; and the concatenating the M1 first feature maps and the M2 second feature maps by using the concatenation operation includes:

concatenating the M1 first feature maps and the processed M2 second feature maps, to obtain the concatenated feature map.

In a possible implementation, the fusing the feature map output by each second block by using a fusion operation includes:

performing concatenation and dimension reduction operations on an output of each second block by using the fusion operation, to obtain the fused feature map whose size is same as the size of the M2 second feature maps.

In a possible implementation, the first block and the M second blocks are blocks in a target stage in the feature extraction network, and the concatenated feature map is used as an output feature map of the target stage in the feature extraction network; or the target stage further includes at least one third block, and the at least one third block is configured to perform a convolution operation on the concatenated feature map, to obtain an output feature map of the target stage.

In a possible implementation, the feature extraction network is configured to: obtain an input image, perform feature extraction on the input image, and output a feature map of the input image; and the method further includes:

processing a corresponding task based on the feature map of the input image by using a task network, to obtain a processing result.

In a possible implementation, the task includes target detection, image segmentation, or image classification.

According to a third aspect, this disclosure provides a data processing apparatus. The apparatus includes:

an obtaining module, configured to obtain a feature extraction network, where the feature extraction network includes a first block, at least one second block connected in series, a target operation, and a concatenation operation, the first block and M second blocks are blocks in a same stage in the feature extraction network, and a quantity of parameters of the target operation is less than a quantity of parameters of the M second blocks;

a convolution processing module, configured to: perform convolution processing on input data by using the first block, to obtain M target feature maps, where each target feature map corresponds to one channel;

perform convolution processing on M1 target feature maps in the M target feature maps by using the at least one second block, to obtain M1 first feature maps, where M1 is less than M; and process M2 target feature maps in the M target feature maps by using the target operation, to obtain M2 second feature maps, where M2 is less than M; and a concatenation module, configured to concatenate the M1 first feature maps and the M2 second feature maps by using the concatenation operation, to obtain a concatenated feature map.

In a possible implementation, an intersection set of the M1 target feature maps and the M2 target feature maps is empty, a sum of M1 and M2 is M, and a quantity of channels of the concatenated feature map is M.

In a possible implementation, the target operation is a convolution operation whose quantity of parameters is less than a quantity of parameters of the at least one second block; or the target operation is a residual connection operation between an output of the first block and an output of the concatenation operation.

In a possible implementation, the at least one second block is configured to perform convolution processing on the M1 target feature maps in the M target feature maps, to obtain a feature map output by each second block, where an output of a second block that is farthest from the first block in the at least one second block is the M1 first feature maps;

the apparatus further includes:

a fusion module, configured to fuse the feature map output by each second block by using a fusion operation, to obtain a fused feature map, where a size of the fused feature map is the same as a size of the M2 second feature maps; and perform an addition operation on the fused feature map and the M2 second feature maps, to obtain processed M2 second feature maps; and the concatenation module is configured to concatenate the M1 first feature maps and the processed M2 second feature maps, to obtain the concatenated feature map.

In a possible implementation, the fusion module is configured to perform concatenation and dimension reduction operations on an output of each second block by using the fusion operation, to obtain the fused feature map whose size is same as the size of the M2 second feature maps.

In a possible implementation, the first block and the M second blocks are blocks in a target stage in the feature extraction network, and the concatenated feature map is used as an output feature map of the target stage in the feature extraction network; or the target stage further includes at least one third block, and the at least one third block is configured to perform a convolution operation on the concatenated feature map, to obtain an output feature map of the target stage.

In a possible implementation, the feature extraction network is configured to: obtain an input image, perform feature extraction on the input image, and output a feature map of the input image; and the apparatus further includes:

a task processing module, configured to process a corresponding task based on the feature map of the input image by using a task network, to obtain a processing result.

In a possible implementation, the task includes target detection, image segmentation, or image classification.

According to a fourth aspect, an embodiment of this disclosure provides a data processing apparatus. The data processing apparatus may include a memory, a processor, and a bus system. The memory is configured to store a program, and the processor is configured to execute the program in the memory, to run the perception network according to any one of the first aspect and the optional implementations of the first aspect.

According to a fifth aspect, an embodiment of this disclosure provides a computer-readable storage medium. The computer-readable storage medium stores a computer program, and when the computer program is run on a computer, the computer is enabled to run the perception network according to any one of the first aspect and the optional implementations of the first aspect.

According to a sixth aspect, an embodiment of this disclosure provides a computer program, including code. When the code is executed, the perception network according to any one of the first aspect and the optional implementations of the first aspect is run.

According to a seventh aspect, an embodiment of this disclosure provides a data processing apparatus. The data processing apparatus may include a memory, a processor, and a bus system. The memory is configured to store a program, and the processor is configured to execute the program in the memory, to perform the method according to any one of the first aspect and the optional implementations of the first aspect.

According to an eighth aspect, an embodiment of this disclosure provides a computer-readable storage medium. The computer-readable storage medium stores a computer program. When the computer program is run on a computer, the computer is enabled to perform the method according to any one of the first aspect and the optional implementations of the first aspect.

According to a ninth aspect, an embodiment of this disclosure provides a computer program, including code. When the code is executed, the method according to any one of the first aspect and the optional implementations of the first aspect is implemented.

According to a tenth aspect, this disclosure provides a chip system. The chip system includes a processor, configured to support an execution device or a training device to implement a function in the foregoing aspects, for example, sending or processing data or information in the foregoing methods. In a possible design, the chip system further includes a memory. The memory is configured to store program instructions and data that are necessary for the execution device or the training device. The chip system may include a chip, or may include a chip and another discrete component.

This embodiment of this disclosure provides the perception network. The perception network includes the feature extraction network. The feature extraction network includes the first block, the at least one second block connected in series, the target operation, and the concatenation operation. The first block and M second blocks are blocks in a same stage in the feature extraction network, and the quantity of parameters of the target operation is less than the quantity of parameters of the M second blocks. The first block is configured to perform convolution processing on the input data, to obtain the M target feature maps. Each target feature map corresponds to one channel. The at least one second block is configured to perform convolution processing on the M1 target feature maps in the M target feature maps, to obtain the M1 first feature maps, where M1 is less than M. The target operation is used to process the M2 target feature maps in the M target feature maps, to obtain the M2 second feature maps, where M2 is less than M. The concatenation operation is used to concatenate the M1 first feature maps and the M2 second feature maps, to obtain the concatenated feature map. In the foregoing manner, the cross-layer target operation in a same stage is used to enable the perception network to generate the feature that has a high similarity to the key feature, to reduce the quantity of parameters of the model, and improve the running speed of the model on the GPU device, the TPU device, and the NPU device.

DESCRIPTION OF EMBODIMENTS

The following describes embodiments of the present invention with reference to the accompanying drawings in embodiments of the present invention. Terms used in implementations of the present invention are merely intended to explain specific embodiments of the present invention, but are not intended to limit the present invention.

The following describes embodiments of this disclosure with reference to the accompanying drawings. It may be learned by a person of ordinary skill in the art that, with development of a technology and emergence of a new scenario, the technical solutions provided in embodiments of this disclosure are also applicable to similar technical problems.

In the specification, claims, and the accompanying drawings of this disclosure, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this disclosure. In addition, the terms "include", "have" and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
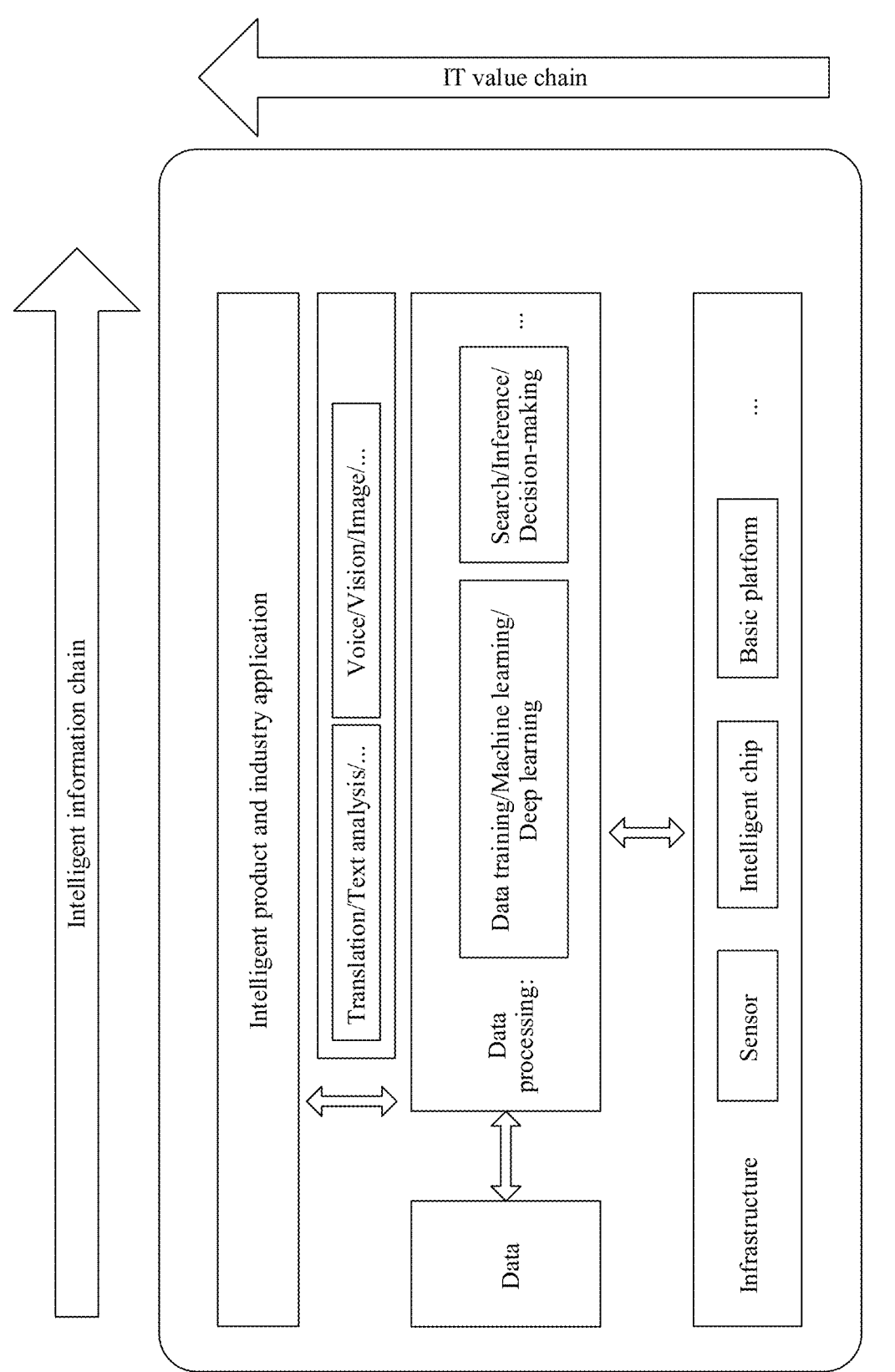
FIG. 1 is a schematic diagram of a structure of an artificial intelligence main framework.

An overall working procedure of an artificial intelligence system is first described. FIG. 1 is a schematic diagram of a structure of an artificial intelligence main framework. The following describes the artificial intelligence main framework from two dimensions: an "intelligent information chain" (horizontal axis) and an "IT value chain" (vertical axis). The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence". The "IT value chain" reflects a value brought by artificial intelligence to the information technology industry from an underlying infrastructure and information (technology providing and processing implementation) of artificial intelligence to an industrial ecological process of a system.

(1) Infrastructure

The infrastructure provides computing capability support for the artificial intelligence system, implements communication with an external world, and implements support by using a basic platform. The infrastructure communicates with the outside by using a sensor. A computing capability is provided by an intelligent chip (a hardware acceleration chip such as a CPU, an NPU, a GPU, an ASIC, or an FPGA). The basic platform includes related platforms such as a distributed computing framework and a network for assurance and support, including cloud storage and computing, an interconnection network, and the like. For example, the sensor communicates with the outside to obtain data, and the data is provided to an intelligent chip in a distributed computing system provided by the basic platform for computing.

(2) Data

Data at an upper layer of the infrastructure indicates a data source in the artificial intelligence field. The data relates to a graph, an image, a voice, and a text, further relates to Internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may be performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formal information based on an inference control policy. Atypical function is searching and matching.

Decision-making is a process in which a decision is made after intelligent information is inferred, and usually provides functions such as classification, ranking, and prediction.

(4) General Capability

After data processing mentioned above is performed on data, some general capabilities may further be formed based on a data processing result, for example, an algorithm or a general system such as translation, text analysis, computer vision processing, speech recognition, and image recognition.

(5) Intelligent Product and Industry Application

The intelligent product and industry application are a product and an application of the artificial intelligence system in various fields, and are a package of an overall solution of the artificial intelligence, so that decision-making for intelligent information is productized and an application is implemented. Application fields thereof mainly include an intelligent terminal, intelligent transportation, intelligent healthcare, autonomous driving, a safe city, and the like.

Embodiments of this disclosure are mainly applied to fields in which a plurality of perception tasks need to be completed, for example, driver assistance, autonomous driving, and a mobile phone terminal. Frame extraction is performed on a video to obtain a single image, and the image is sent to the perception network in the present invention, to obtain information such as 2D, 3D, a mask, and a keypoint of an object of interest in the image. A detection result is output to a post-processing module for processing, for example, sent to a planning control unit in an autonomous driving system for decision-making, or sent to a mobile phone terminal for processing based on a beautification algorithm to obtain a beautified image. The following briefly describes two application scenarios: ADAS/ADS visual perception system and mobile phone beautification.

Application Scenario 1: ADAS/ADS Visual Perception System

Figure 2A:
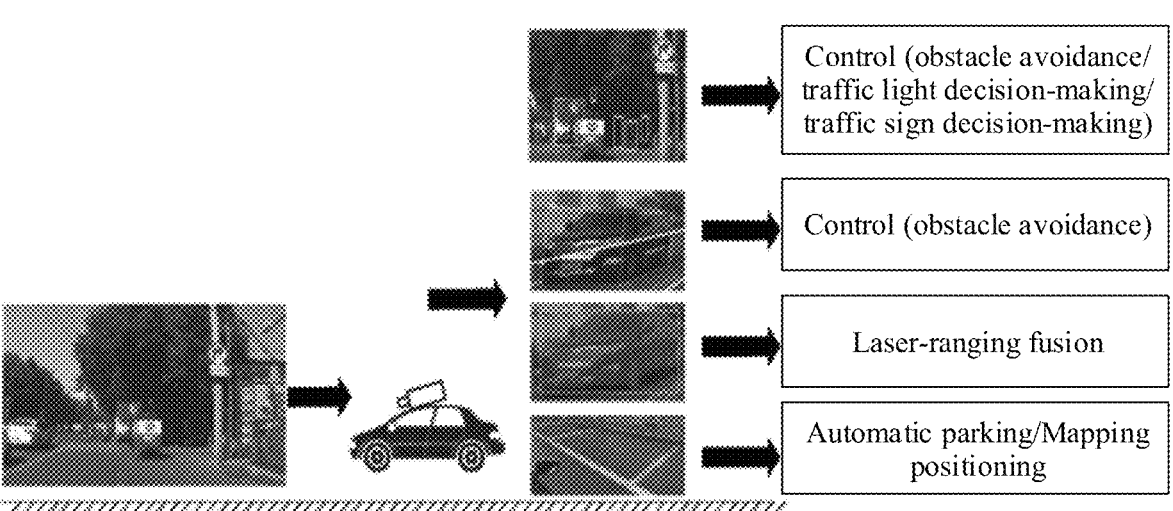
FIG. 2a is a schematic diagram of an application scenario according to an embodiment of this disclosure.

As shown in FIG. 2a, in ADAS and ADS, a plurality of types of 2D targets need to be detected in real time, and include a dynamic obstacle (a pedestrian (Pedestrian), a cyclist (Cyclist), a tricycle, a car, a truck, or a bus), a static obstacle (a traffic cone, a traffic stick, a fire hydrant, a motorcycle, or a bicycle), or a traffic sign, a guide sign, a billboard, a red traffic light/yellow traffic light/green traffic light/black traffic light, or a road sign). In addition, to accurately obtain a region occupied by the dynamic obstacle in 3D space, 3D estimation further needs to be performed on the dynamic obstacle, to output a 3D box. To integrate with data of laser radar, a mask of a dynamic obstacle needs to be obtained to select laser point clouds that hit the dynamic obstacle. To accurately locate a parking space, four keypoints of the parking space need to be detected simultaneously. For image composition positioning, keypoints of the static obstacle need to be detected. By using the technical solutions provided in embodiments of this disclosure, all or a part of the foregoing functions can be completed in the perception network.

Application Scenario 2: Beautification Function of a Mobile Phone

Figure 2B:
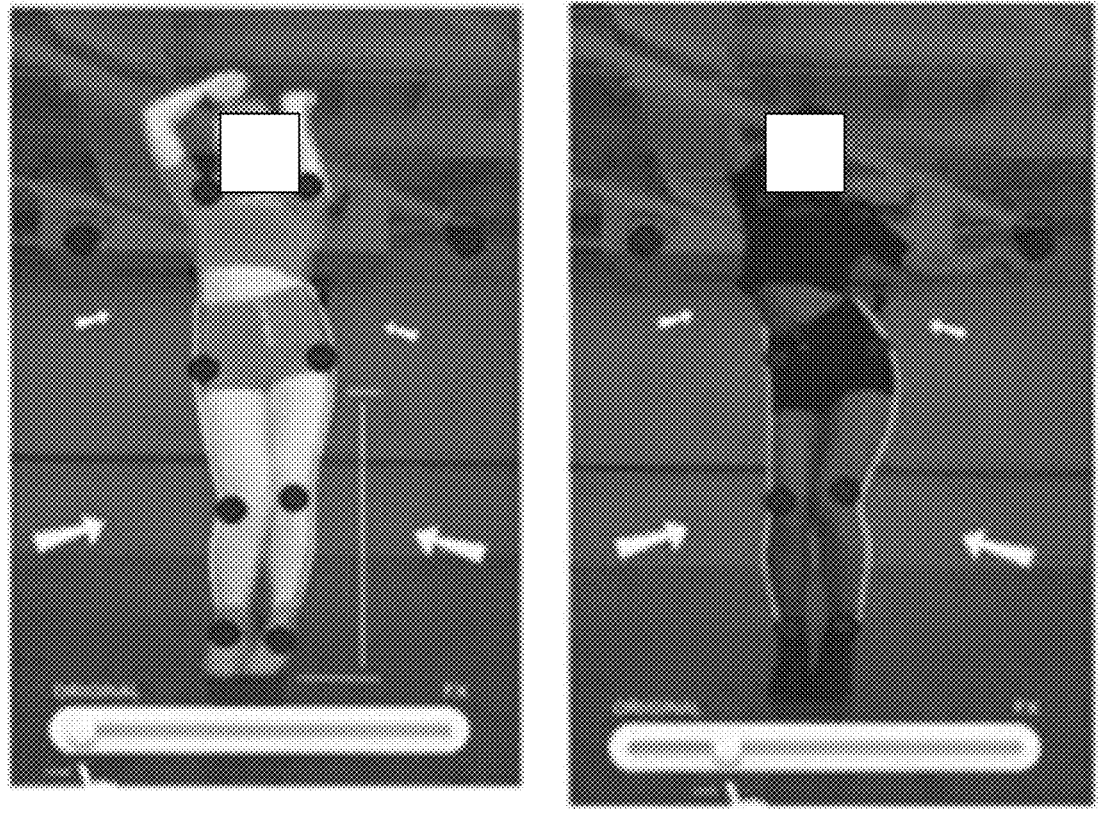
FIG. 2b is a schematic diagram of an application scenario according to an embodiment of this disclosure.

As shown in FIG. 2b, in the mobile phone, a mask and a keypoint of a human body are detected by using a perception network provided in embodiments of this disclosure, and a corresponding part of the human body may be scaled up/down. For example, a waist-sizing operation and a hip-dressing operation are performed, to output a beauty image.

Application Scenario 3: Image Classification Scenario

After obtaining a to-be-classified image, an object recognition apparatus obtains a category of an object in the to-be-classified image in an object recognition method in this disclosure, and then may classify the to-be-classified image based on the category of the object in the to-be-classified image. A photographer takes many photos every day such as a photo of an animal, a photo of a person, and a photo of a plant. According to the method in this disclosure, the photos can be quickly classified based on content in the photos, and may be classified into a photo including an animal, a photo including a person, and a photo including a plant.

When there are a large quantity of images, efficiency of a manual classification manner is low, and a person is prone to be tired when processing a same thing for a long period of time. In this case, a classification result has a big error. However, according to the method in this disclosure, the images can be quickly classified without an error.

Application scenario 4: Commodity Classification

After obtaining a commodity image, the object recognition apparatus obtains a category of a commodity in the commodity image in the object recognition method in this disclosure, and then classifies the commodity based on the category of the commodity.

Because embodiments of this disclosure relate to massive applications of a neural network, for ease of understanding, the following first describes related terms and related concepts such as the neural network in embodiments of this disclosure.

(1) Object Recognition

A category of an image or object is determined in a related method such as image processing, machine learning, or computer graphics.

(2) Neural Network

The neural network may include a neural unit. The neural unit may be an operation unit for which $x_s$ and an intercept of 1 are used as an input. An output of the operation unit may be as follows:

$$h_{W,b}(x) = f\left(W^T x\right) = f\left(\sum_{s=1}^{n} W_s x_s + b\right) \qquad (1\text{-}1)$$

Herein, s=1, 2, . . . , or n, n is a natural number greater than 1, $W_s$ is a weight of $x_s$, b is a bias of the neural unit, and f is an activation function of the neural unit, and is used to introduce a nonlinear feature into the neural network, to convert an input signal in the neural unit into an output signal. The output signal of the activation function may serve as an input of a next convolutional layer. The activation function may be a sigmoid function. The neural network is a network formed by connecting many single neural units together. To be specific, an output of a neural unit may be an input of another neural unit. An input of each neural unit may be connected to a local receptive field of a previous layer to extract a feature of the local receptive field. The local receptive field may be a region including several neural units.

(3) Deep Neural Network

The deep neural network (DNN) may be understood as a neural network including many hidden layers. There is no special metric standard for "many" herein. A multi-layer neural network and the deep neural network are essentially the same. The DNN is divided based on locations of different layers, and a neural network in the DNN may be divided into three types: an input layer, a hidden layer, and an output layer. Usually, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer. Although the DNN seems to be complex, the DNN is actually not complex in terms of work at each layer, and is simply expressed as the following linear relationship expression:

$$\vec{y} = \alpha\left(W\vec{x} + \vec{b}\right).$$

Herein, $\vec{x}$ is an input vector, $\vec{y}$ is an output vector, $\vec{b}$ is an offset vector, W is a weight matrix (also referred to as a coefficient), and $\alpha(\ )$ is an activation function. At each layer, such a simple operation is performed on the input vector $\vec{x}$, to obtain the output vector $\vec{y}$. Because the DNN includes a large quantity of layers, there are also a large quantity of coefficients W and a large quantity of offset vectors $\vec{b}$. How is a specific parameter defined in the DNN? First, a definition of a coefficient W is described. A three-layer DNN is used as an example. For example, a linear coefficient from a fourth neuron at a second layer to a second neuron at a third layer is defined as $$w_{24}^3.$$

A superscript 3 represents a number of a layer corresponding to the coefficient W, and a subscript corresponds to an output index 2 of the third layer and an input index 4 of the second layer. In conclusion, a coefficient from a $k^{th}$ neuron at an $(L-1)^{th}$ layer to a $j^{th}$ neuron at an $L^{th}$ layer is defined as $$W_{jk}^L.$$

It should be noted that there is no parameter W at the input layer. In the deep neural network, more hidden layers make the network more capable of describing a complex case in the real world. Theoretically, a model with more parameters has higher complexity and a larger "capacity", and can be used to complete a more complex learning task.

(4) Convolutional neural network (CNN) is a deep neural network with a convolutional architecture. The convolutional neural network includes a feature extractor including a convolutional layer and a sub-sampling layer. The feature extractor may be considered as a filter. A convolution process may be considered as performing a convolution on an input image or a convolutional feature plane by using a trainable filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neural units that are in a rectangular arrangement. Neural units in a same feature plane share a weight, and the weight shared herein is a convolution kernel. Weight sharing may be understood as that an image information extraction manner is irrelevant to a location. A principle implied herein is that statistical information of a part of an image is the same as that of another part. This means that image information learned from a part can also be used in another part. Therefore, the same image information obtained through learning can be used for all locations on the image. At a same convolutional layer, a plurality of convolution kernels may be used to extract different image information. Usually, a larger quantity of convolution kernels indicates richer image information reflected by performing a convolution operation.

The convolution kernel may be initialized in a form of a matrix of a random size. In a training process of the convolutional neural network, the convolution kernel may obtain a proper weight through learning. In addition, benefits directly brought by weight sharing are that connections among layers of the convolutional neural network are reduced, and an overfitting risk is reduced.

Figure 2C:
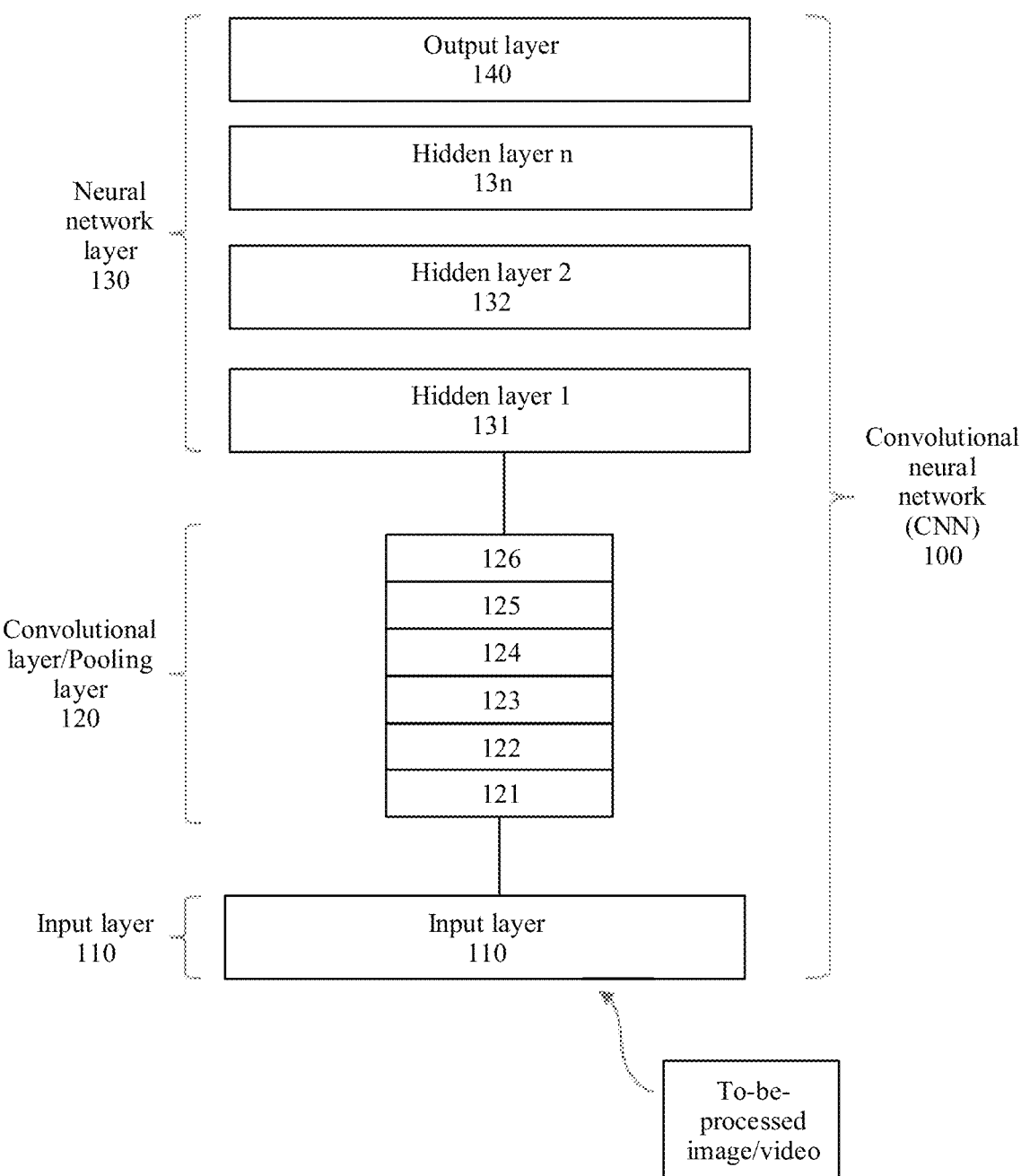
FIG. 2c is a schematic diagram of a convolutional neural network according to an embodiment of this disclosure.

Because the CNN is a very common neural network, the following mainly describes a detailed description of a structure of the CNN with reference to FIG. 2c. As described in the foregoing basic concepts, the convolutional neural network is a deep neural network with a convolutional architecture, and is a deep learning architecture. In the deep learning architecture, multi-layer learning is performed at different abstract levels by using a machine learning algorithm. As a deep learning architecture, the CNN is a feed-forward artificial neural network. Neurons in the feed-forward artificial neural network may respond to an input image.

In FIG. 2c, a convolutional neural network (CNN) 100 may include an input layer 110, a convolutional layer/pooling layer 120 (the pooling layer is optional), and a neural network layer 130. The input layer 120 may obtain a to-be-processed image, and send the obtained to-be-processed image to the convolutional layer/pooling layer 120 and the subsequent neural network layer 130 for processing, to obtain a processing result of the image. The following describes in detail an internal layer structure of the CNN 100 in FIG. 2c.

Convolutional Layer/Pooling Layer 120

Convolutional Layer:

As shown in FIG. 2c, the convolutional layer/pooling layer 120 may include, for example, layers 121 to 126. For example, in an implementation, a layer 121 is a convolutional layer, a layer 122 is a pooling layer, a layer 123 is a convolutional layer, a layer 124 is a pooling layer, a layer 125 is a convolutional layer, and a layer 126 is a pooling layer. In another implementation, layers 121 and 122 are convolutional layers, a layer 123 is a pooling layer, layers 124 and the 125 are convolutional layers, and a layer 126 is a pooling layer. That is, an output of the convolutional layer may be used as an input of a subsequent pooling layer, or may be used as an input of another convolutional layer to continue a convolution operation.

The following describes an internal working principle of the convolutional layer by using the convolutional layer 121 as an example.

The convolutional layer 121 may include a plurality of convolution operators. The convolution operator is also referred to as a kernel. During image processing, the convolution operator functions as a filter that extracts specific information from an input image matrix. The convolution operator may essentially be a weight matrix, and the weight matrix is usually predefined. In a process of performing a convolution operation on the image, the weight matrix usually processes pixels at one by one (or two by two, . . . , depending on a value of a stride stride) in a horizontal direction on the input image, to extract a specific feature from the image. A size of the weight matrix needs to be related to a size of the image. It should be noted that a depth dimension of the weight matrix is the same as a depth dimension of the input image. In a convolution operation process, the weight matrix extends to an entire depth of the input image. Therefore, a convolution output of a single depth dimension is generated through a convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "plurality of". Different weight matrices may be used to extract different features from the image. For example, one weight matrix is used to extract edge information of the image, another weight matrix is used to extract a specific color of the image, and a further weight matrix is used to blur unnecessary noise in the image. The plurality of weight matrices have a same size (rows×columns), and convolutional feature maps extracted from the plurality of weight matrices with a same size have a same size. Then, the plurality of extracted convolutional feature maps with a same size are combined to form an output of the convolution operation.

Weight values in these weight matrices need to be obtained through massive training in an actual application. Each weight matrix formed by using the weight values obtained through training may be used to extract information from an input image, so that the convolutional neural network 100 performs correct prediction.

When the convolutional neural network 100 includes a plurality of convolutional layers, an initial convolutional layer (for example, the layer 121) usually extracts a large quantity of general features. The general feature may also be referred to as a low-level feature. As a depth of the convolutional neural network 100 increases, a more subsequent convolutional layer (for example, the layer 126) extracts a more complex feature, for example, a feature with high-level semantics. A feature with higher semantics is more applicable to a to-be-resolved problem.

Pooling Layer:

Because a quantity of training parameters usually needs to be reduced, the pooling layer usually needs to be periodically introduced after the convolutional layer. For the layers 121 to 126 shown in 120 in FIG. 2c, one convolutional layer may be followed by one pooling layer, or a plurality of convolutional layers may be followed by one or more pooling layers. In an image processing process, the pooling layer is only used to reduce a space size of the image. The pooling layer may include an average pooling operator and/or a maximum pooling operator, to perform sampling on the input image to obtain an image with a small size. The average pooling operator may be used to calculate pixel values in the image in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 130:

After processing is performed by the convolutional layer/pooling layer 120, the convolutional neural network 100 still cannot output required output information. As described above, at the convolutional layer/pooling layer 120, only a feature is extracted, and parameters brought by the input image are reduced. However, to generate final output information (required class information or other related information), the convolutional neural network 100 needs to generate an output of a quantity of one or a group of required classes by using the neural network layer 130. Therefore, the neural network layer 130 may include a plurality of hidden layers (layers 131, 132, . . . , and 13*n* shown in FIG. 2*c*) and an output layer 140. Parameters included at the plurality of hidden layers may be obtained through pre-training based on related training data of a specific task type. For example, the task type may include image recognition, image classification, and super-resolution image reconstruction.

The output layer 140 is after the plurality of hidden layers in the neural network layer 130. In other words, a last layer of the entire convolutional neural network 100 is the output layer 140. The output layer 140 has a multi-class cross-entropy loss function, and is specifically configured to calculate a prediction error. Once forward propagation (for example, in FIG. 2*c*, propagation in a direction from 120 to 140 is forward propagation) of the entire convolutional neural network 100 is completed, back propagation (for example, in FIG. 2*c*, propagation in a direction from 140 to 120 is back propagation) starts to update a weight value of each layer mentioned above and a deviation, so as to reduce a loss of the convolutional neural network 100 and an error between a result output by the output layer of the convolutional neural network 100 and an ideal result.

It should be noted that the convolutional neural network 100 shown in FIG. 2*c* is merely used as an example of the convolutional neural network. In a specific application, the convolutional neural network may alternatively exist in a form of another network model.

Figure 2D:
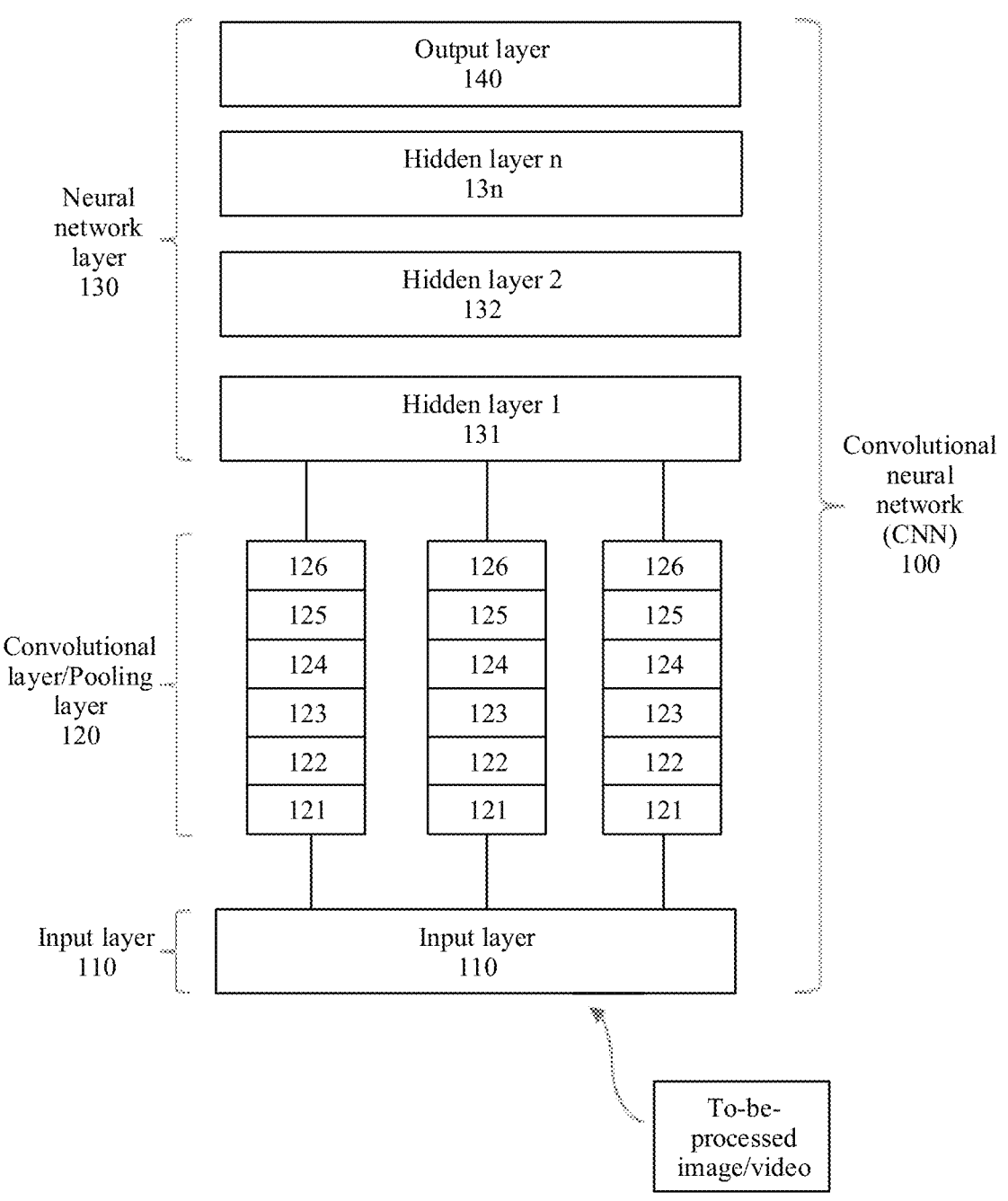
FIG. 2d is a schematic diagram of a convolutional neural network according to an embodiment of this disclosure.

A structure of a neural network specifically used in an image processing method in embodiments of this disclosure may be shown in FIG. 2*d*. In FIG. 2*d*, a convolutional neural network (CNN) 100 may include an input layer 110, a convolutional layer/pooling layer 120 (the pooling layer is optional), and a neural network layer 130. Compared with FIG. 2*c*, in FIG. 2*d*, at the convolutional layer/pooling layer 120, a plurality of convolutional layers/pooling layers are in parallel, and respectively extracted features are input to the neural network layer 130 for processing.

It should be noted that the convolutional neural networks shown in FIG. 2*c* and FIG. 2*d* are merely used as an example. In a specific application, the convolutional neural network may alternatively exist in a form of another network model.

(5) Back Propagation Algorithm

In a training process, the convolutional neural network may correct a value of a parameter in an initial super-resolution model based on an error back propagation (BP) algorithm, so that a reconstruction error loss of the super-resolution model becomes smaller. Specifically, an input signal is transferred forward until the error loss is generated in an output, and the parameter in the initial super-resolution model is updated through back propagation of information about the error loss, to converge the error loss. The back propagation algorithm is an error-loss-centered back propagation motion intended to obtain a parameter, for example, a weight matrix, of an optimal super-resolution model.

(6) Loss Function

In a process of training the deep neural network, because it is expected that an output of the deep neural network is as close as possible to a value that actually needs to be predicted, a current predicted value of the network and an actually expected target value may be compared, and then a weight vector of each layer of the neural network is updated based on a difference between the current predicted value and the target value (certainly, there is usually an initialization process before a first update, to be specific, parameters are preconfigured for all layers of the deep neural network). For example, if the predicted value of the network is large, the weight vector is adjusted to decrease the predicted value, and adjustment is continuously performed, until the deep neural network can predict the actually expected target value or a value that more approximates the actually expected target value. Therefore, "how to obtain a difference between the predicted value and the target value through comparison" needs to be predefined. This is a loss function or an objective function. The loss function and the objective function are important equations for measuring the difference between the predicted value and the target value. The loss function is used as an example. A higher output value (loss) of the loss function indicates a larger difference. Therefore, training of the deep neural network is a process of minimizing the loss as much as possible.

(7) Back Propagation Algorithm

In the training process, the neural network may correct the value of the parameter in the initial neural network model based on the error back propagation (back propagation, BP) algorithm, so that the reconstruction error loss of the neural network model becomes smaller. Specifically, an input signal is forward transferred until the error loss is generated in an output, and the parameter of the neural network model is updated through back propagation of information about the error loss, to converge the error loss. The back propagation algorithm is an error-loss-centered back propagation motion intended to obtain the parameter, for example, the weight matrix, of the optimal neural network model.

The following describes a system architecture provided in embodiments of this disclosure.

Figure 3:
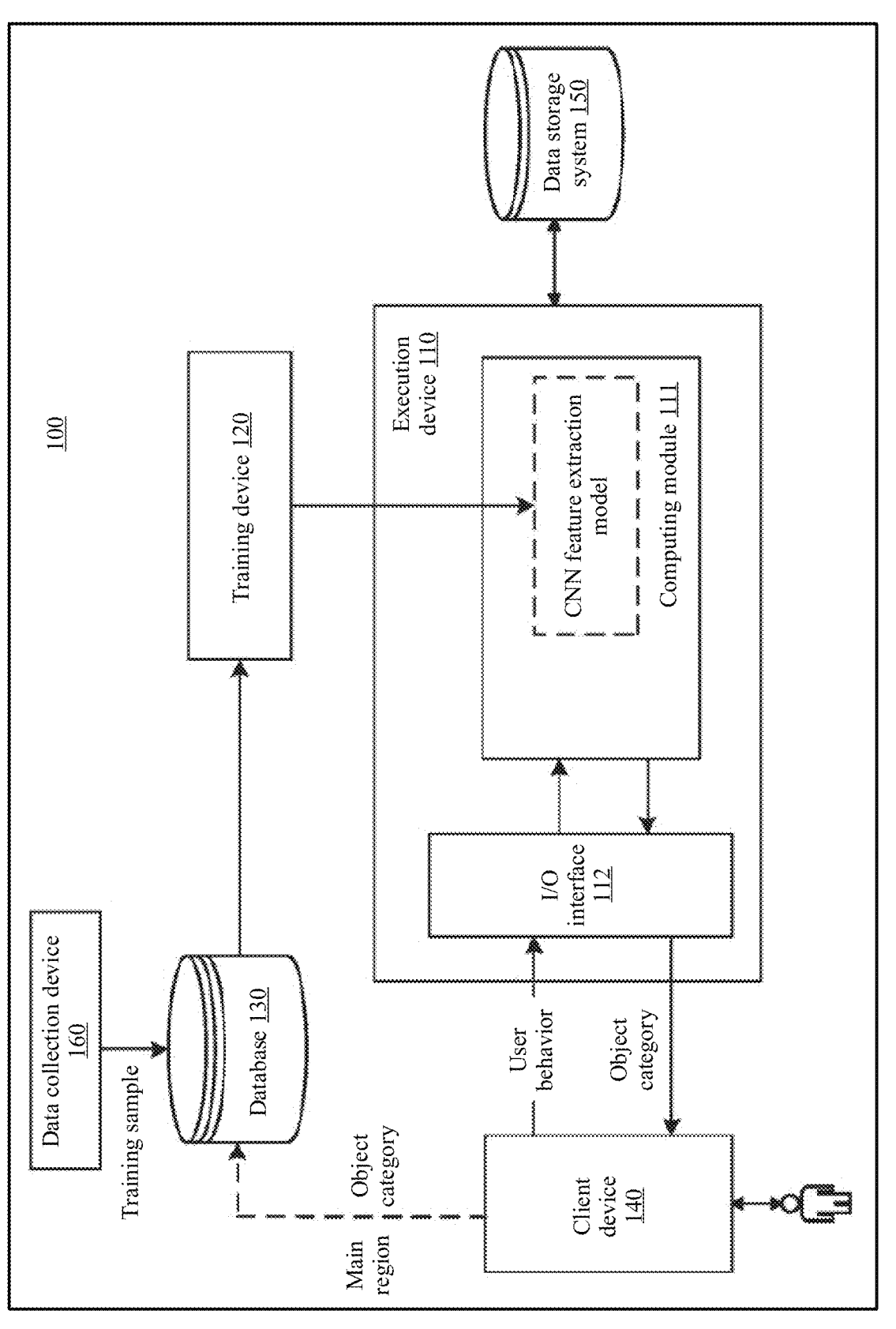
FIG. 3 is a schematic diagram of a system architecture according to an embodiment of this disclosure.

Refer to FIG. 3. An embodiment of this disclosure provides a system architecture 100. As shown in the system architecture 100, a data collection device 160 is configured to collect training data. In this embodiment of this disclosure, the training data includes an image or an image block of an object and a category of the object. The data collection device 160 stores the training data in a database 130. A training device 120 performs training based on the training data maintained in the database 130, to obtain a CNN feature extraction network (explanations and descriptions: The feature extraction network herein is the foregoing model obtained through training in a training phase, and may be a neural network, or the like used to perform feature extraction). The following describes, in more detail in Embodiment 1, how the training device 120 obtains the CNN feature extraction network based on the training data. The CNN feature extraction network can be used to implement a perception network provided in embodiments of this disclosure. To be specific, a to-be-recognized image or image block is input to the CNN feature extraction network after related preprocessing. In this embodiment of this disclosure, the CNN feature extraction network may be specifically a CNN convolutional neural network. It should be noted that, in an actual application, the training data maintained in the database 130 is not necessarily all collected by the data collection device 160, and may be received from another device. In addition, it should be noted that the training device 120 may not necessarily train the CNN feature extraction network completely based on the training data maintained in the database 130, or may obtain training data from a cloud or another place to perform model training. The foregoing descriptions should not be construed as a limitation on this embodiment of this disclosure.

A target model/rule obtained through training by the training device 120 may be applied to different systems or devices, for example, an execution device 110 shown in FIG. 3. The execution device 110 may be a terminal, for example, a mobile phone terminal, a tablet computer, a laptop computer, an augmented reality (AR)/virtual reality (VR) terminal, or a vehicle-mounted terminal, or may be a server, a cloud, or the like. In FIG. 3, the execution device 110 is configured with an input/output (I/O) interface 112, configured to exchange data with an external device. A user may input data to the I/O interface 112 by using a client device 140. In this embodiment of this disclosure, the input data may include the image or the image block.

In a process in which the execution device 110 preprocesses the input data, or in a process in which a computing module 111 of the execution device 120 performs related processing such as calculation (for example, implements a function of the neural network in this disclosure), the execution device 120 may invoke data, code, and the like in a data storage system 150 for corresponding processing; or may store data, instructions, and the like obtained through corresponding processing in the data storage system 150.

Finally, the I/O interface 112 returns a processing result such as the obtained information such as 2D, 3D, a mask, and keypoints of the object of interest in the image, image block, or picture to the client device 140, to provide the processing result to the user.

Optionally, the client device 140 may be a planning control unit in an autonomous driving system or a beautification algorithm module in the mobile phone terminal.

It should be noted that the training device 120 may generate corresponding target models/rules for different targets or different tasks based on different training data. The corresponding target models/rules may be used to implement the foregoing targets or complete the foregoing tasks, to provide a required result for the user.

In a case shown in FIG. 3, the user may manually provide the input data and the user may manually provide the input data in an interface provided by the I/O interface 112. In another case, the client device 140 may automatically send the input data to the I/O interface 112. If it is required that the client device 140 needs to obtain authorization from the user to automatically send the input data, the user may set corresponding permission in the client device 140. The user may view, on the client device 140, a result output by the execution device 110. Specifically, the result may be presented in a form of displaying, a sound, an action, or the like. The client device 140 may alternatively be used as a data collection end, to collect, as new sample data, input data that is input to the I/O interface 112 and an output result that is output from the I/O interface 112 that are shown in the figure, and store the new sample data in the database 130. Certainly, the client device 140 may alternatively not perform collection. Instead, the I/O interface 112 directly stores, in the database 130 as new sample data, the input data input to the I/O interface 112 and the output result output from the I/O interface 112 that are shown in the figure.

It should be noted that FIG. 3 is merely a schematic diagram of a system architecture according to an embodiment of this disclosure. A location relationship between a device, a component, a module, and the like shown in the figure constitutes no limitation. For example, in FIG. 3, the data storage system 150 is an external memory relative to the execution device 110. In another case, the data storage system 150 may alternatively be disposed in the execution device 110.

First, a model inference phase is used as an example to describe a perception network provided in embodiments of this disclosure.

Figure 6:
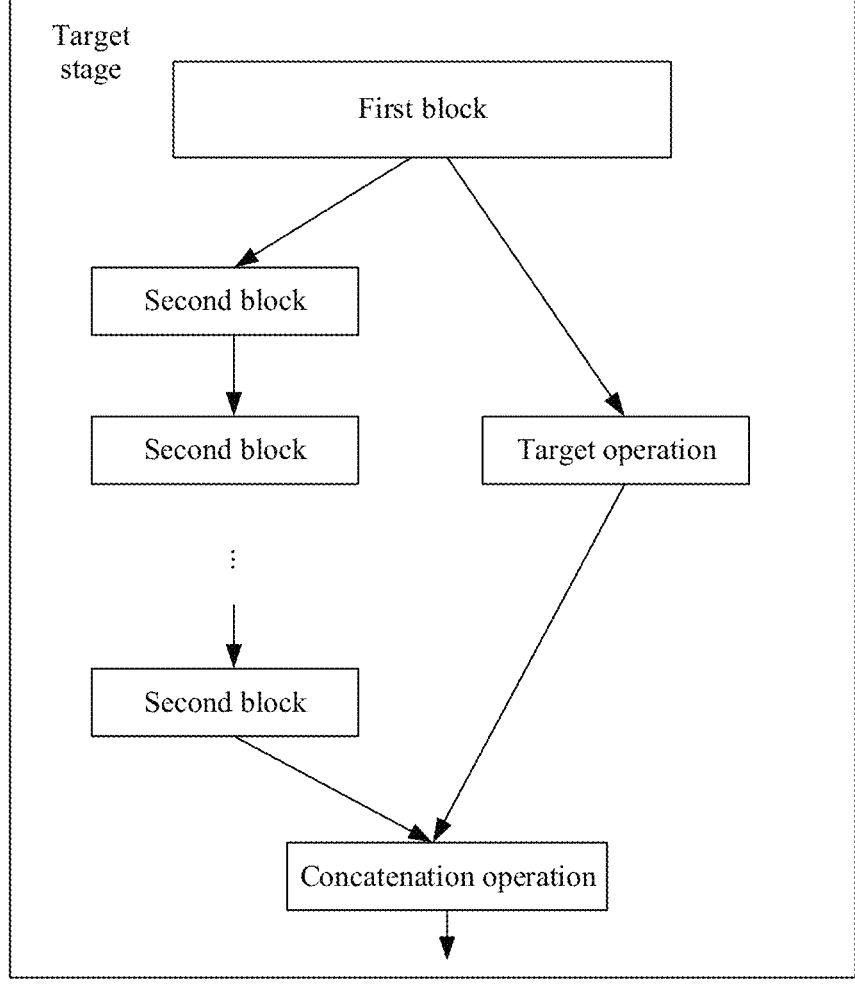
FIG. 6 to FIG. 14 each are a schematic diagram of a perception network according to an embodiment of this disclosure.

FIG. 6 is a schematic diagram of a structure of a perception network according to an embodiment of this disclosure. As shown in FIG. 6, the perception network provided in this embodiment of this disclosure includes a feature extraction network. The feature extraction network includes a first block, at least one second block connected in series, a target operation, and a concatenation operation. The first block and M second blocks are blocks in a same stage in the feature extraction network (a target stage is shown in FIG. 6).

Figure 5A:
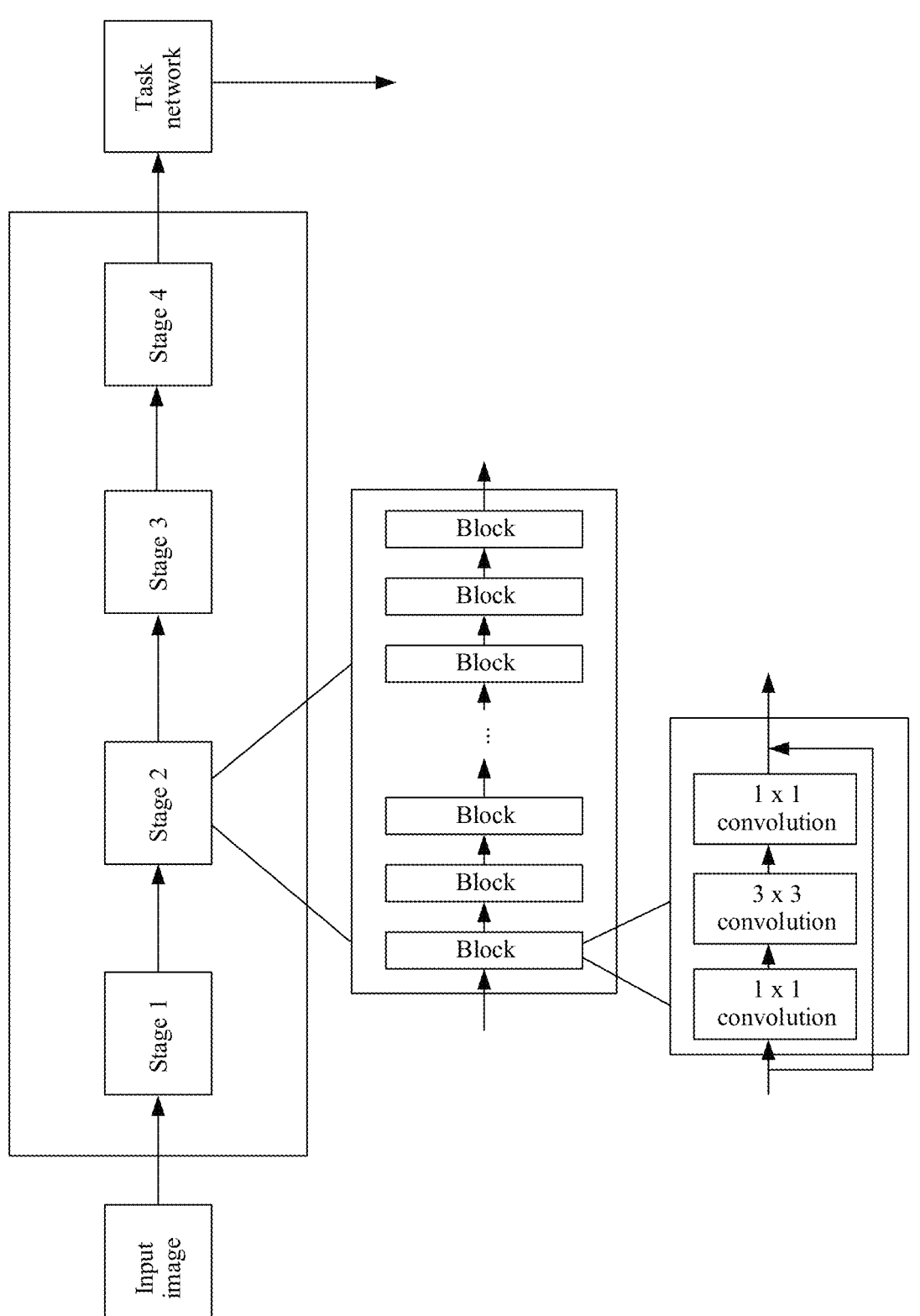
FIG. 5a is a schematic diagram of a perception network according to an embodiment of this disclosure.

The feature extraction network usually includes a plurality of stages, each stage may include a plurality of blocks, and each block may include at least one convolution operation. FIG. 5*a* is a schematic diagram of a structure of a perception network in the conventional technology. The feature extraction network includes four stages (a stage 1, a stage 2, a stage 3, and a stage 4), and an input feature map and an output feature map of a block included in each stage have a same size. That the input feature map and the output feature map have a same size means that the feature maps include a same quantity of channels and feature maps of all channels have a same size. For example, a size of an input feature map and an output feature map of each block in the stage 1 is 56×56, and a quantity of channels is 24; a size of an input feature map and an output feature map of each block in the stage 2 is 28×28, and a quantity of channels is 40; a size of an input feature map and an output feature map of each block in the stage 3 is 14×14, and a quantity of channels is 80; and a size of an input feature map and an output feature map of each block in the stage 4 is 7×7, and a quantity of channels is 160. Each block may include at least one convolution operation, for example, three convolution operations (a 1×1 convolution, a 3×3 convolution, and a 1×1 convolution) shown in FIG. 5*a*, and there is also a residual connection operation that connects an input and an output.

Figure 5B:
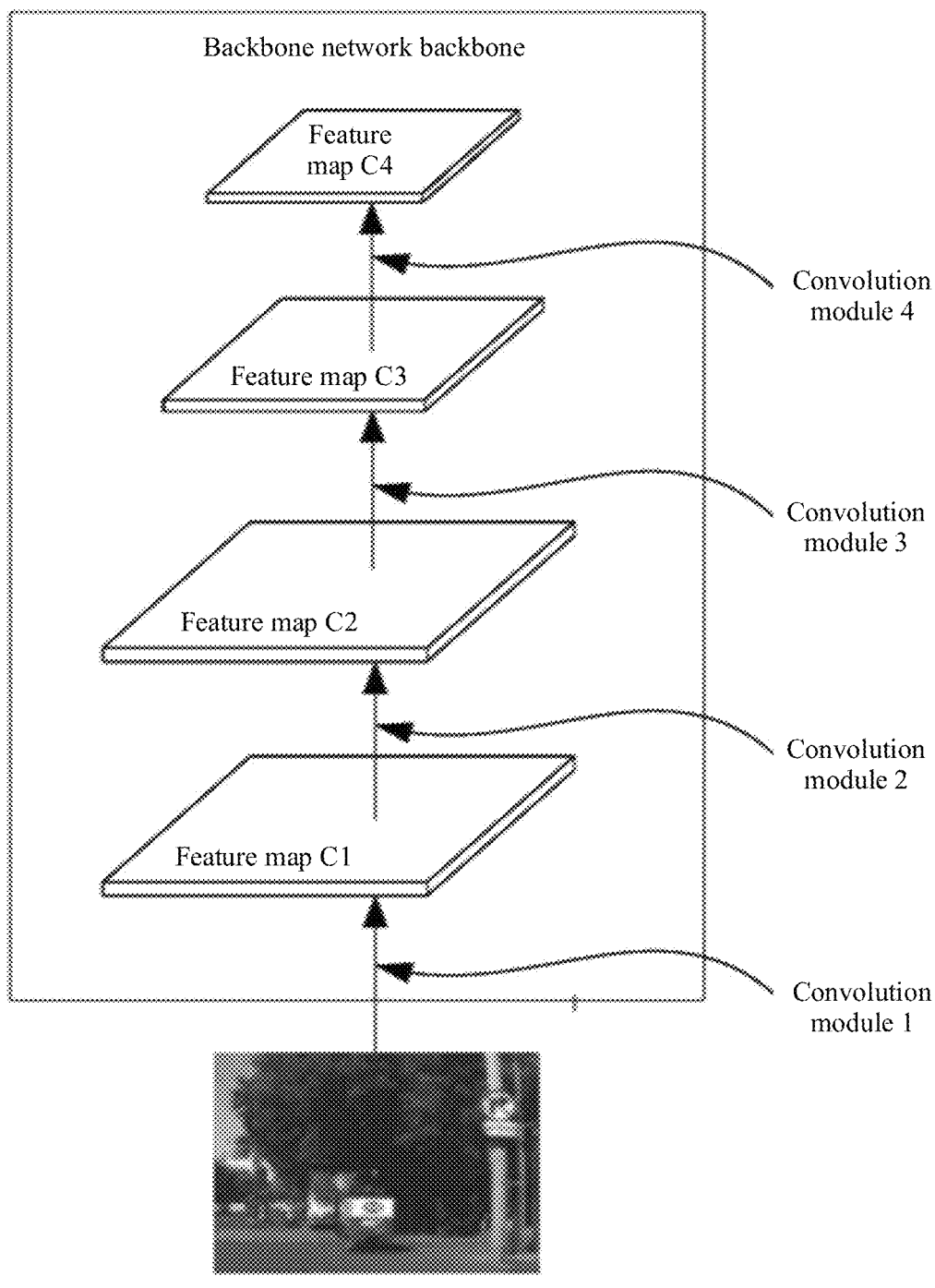
FIG. 5b is a schematic diagram of a perception network according to an embodiment of this disclosure.

For details, refer to FIG. 5*b*. A convolution module in FIG. 5*b* may be represented as a stage. In this case, a convolution module 1 may correspond to a stage 1 in FIG.

Figure 5C:
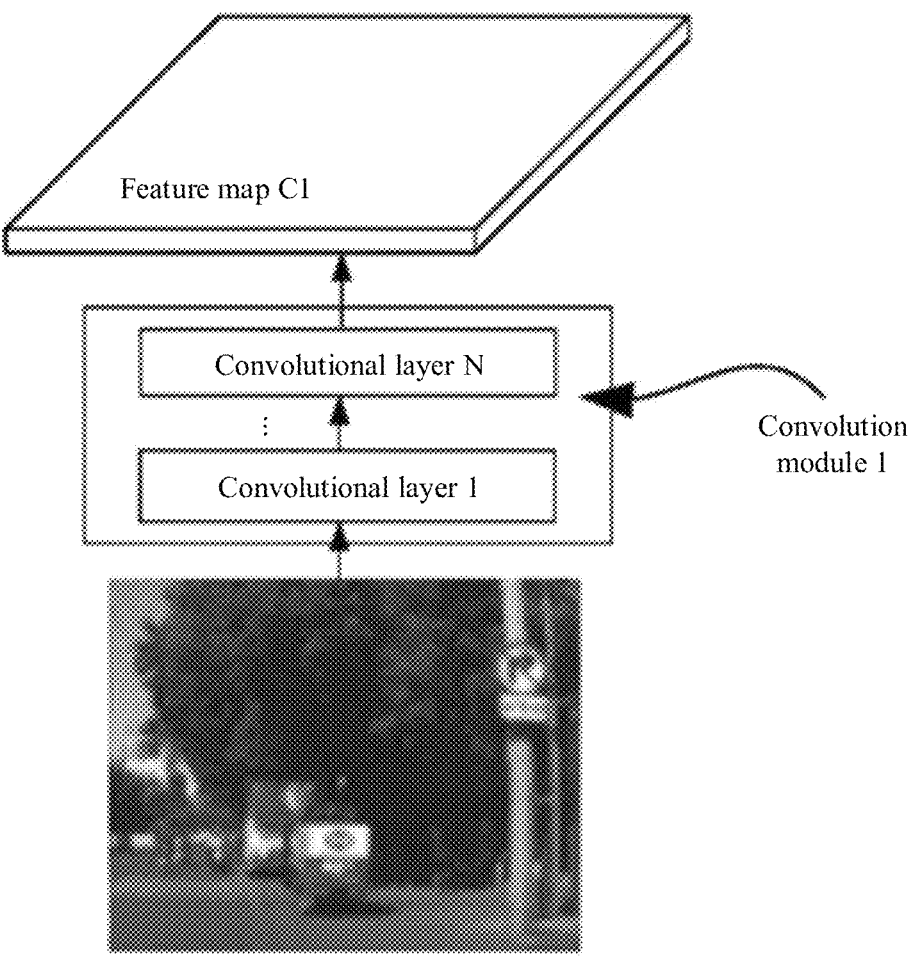
FIG. 5c is a schematic diagram of a perception network according to an embodiment of this disclosure.

5a, a convolution module 2 may correspond to a stage 2 in FIG. 5a, a convolution module 3 may correspond to a stage 3 in FIG. 5a, a convolution module 4 may correspond to a stage 4 in FIG. 5a, a feature map C1 is a feature map output by the stage 1, a feature map C2 is a feature map output by the stage 2, a feature map C3 is a feature map output by the stage 3, and a feature map C4 is a feature map output by the stage 4. The stage 1 is used as an example. Refer to FIG. 5c. The convolution module 1 may include a plurality of convolutional layers (or referred to as blocks).

The feature extraction network may perform feature extraction on an input image, to obtain an output feature map. The output feature map may be input to a task network, and the task network processes a corresponding task, to obtain a processing result. For example, if the task may be target detection, the processing result may be a detection box in which a target in the image is located; and if the task may be image segmentation, the processing result may be an image segmentation area in which the target in the image is located.

Figure 5D:
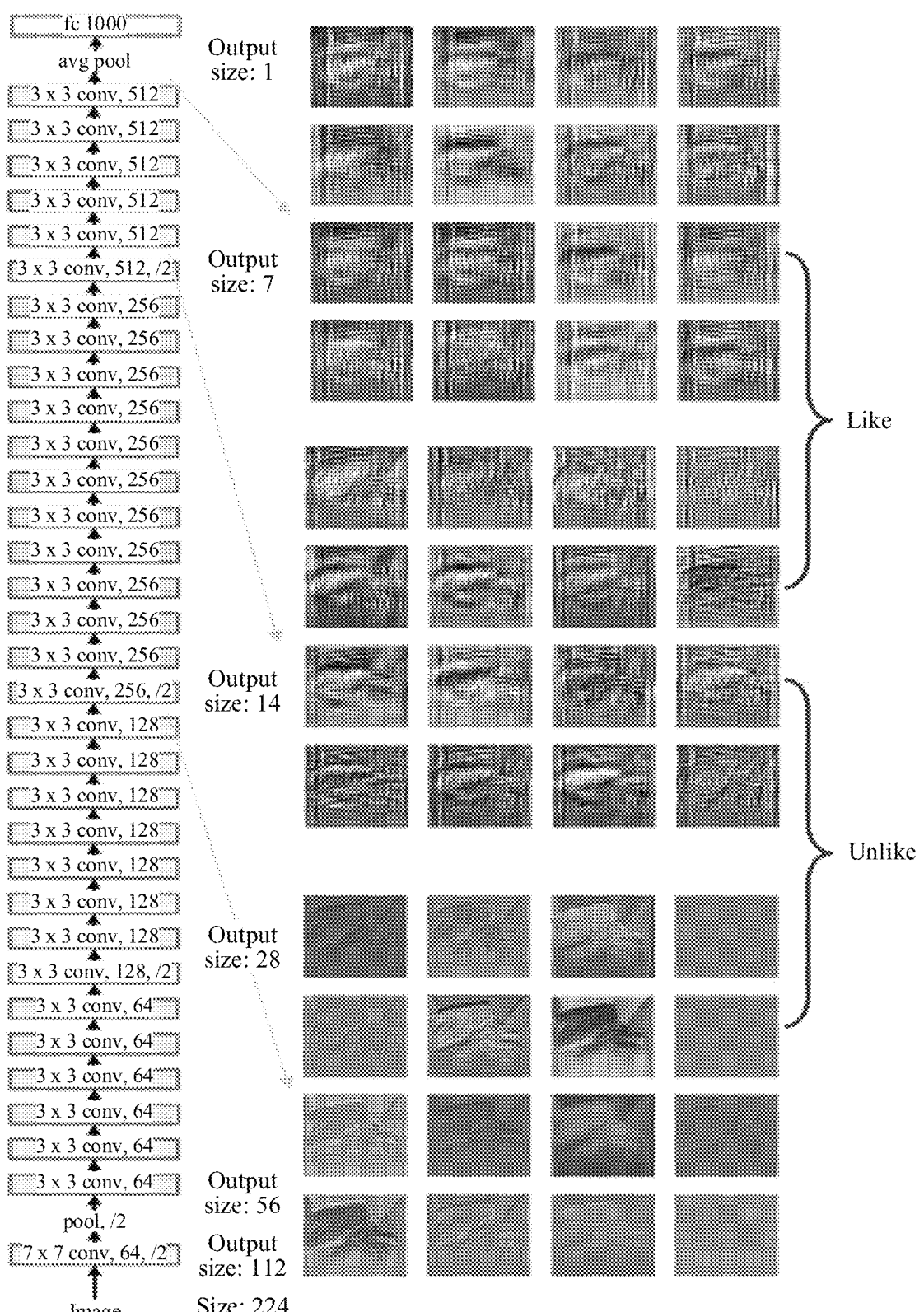
FIG. 5d is a schematic diagram of a perception network according to an embodiment of this disclosure.

Refer to FIG. 5d. Output features of different blocks in a same stage of the feature extraction network have a high similarity, but output features of blocks in different stages have a low similarity. Therefore, in this embodiment of this disclosure, a cross-layer target operation in a same stage is used to enable the perception network to generate a feature that has a high similarity to a key feature, to reduce a quantity of parameters of a model, and improve a running speed of a model on a GPU device, a TPU device, and an NPU device.

The following describes in detail the perception network in this embodiment of this disclosure.

In this embodiment of this disclosure, the feature extraction network includes the first block, the at least one second block connected in series, the target operation, and the concatenation operation, the first block and the M second blocks are blocks in a same stage in the feature extraction network, and a quantity of parameters of the target operation is less than a quantity of parameters of the M second blocks.

Refer to FIG. 6. The first block is configured to perform convolution processing on input data, to obtain M target feature maps. Each target feature map corresponds to one channel.

The at least one second block is configured to perform convolution processing on M1 target feature maps in the M target feature maps, to obtain M1 first feature maps, where M1 is less than M. The target operation is used to process M2 target feature maps in the M target feature maps, to obtain M2 second feature maps, where M2 is less than M. The concatenation operation is used to concatenate the M1 first feature maps and the M2 second feature maps, to obtain a concatenated feature map.

In a possible implementation, an intersection set of the M1 target feature maps and the M2 target feature maps is empty, a sum of M1 and M2 is M, and a quantity of channels of the concatenated feature map is M.

It is equivalent to that an output feature map of the at least one second block is a part of the target feature map output by the first block, or a quantity of channels of an output feature map of the at least one second block is a part of a quantity of channels of the target feature map output by the first block, and a target feature map of a remaining part of channels is processed by using the target operation. In addition, because the quantity of parameters of the target operation is less than a quantity of parameters of the at least one second block, an overall quantity of parameters of the perception network is reduced, and a running speed of the perception network on the GPU device, the TPU device, and the NPU device can be improved.

In a possible implementation, the target operation is a convolution operation whose quantity of parameters is less than a quantity of parameters of the at least one second block; or the target operation is a residual connection operation between an output of the first block and an output of the concatenation operation.

For example, the target operation is a 1×1 convolution, or the target operation is a residual connection operation between an output of the first block and an output of the concatenation operation. It is equivalent to that the M2 second feature maps are the M1 first feature maps. In other words, the M1 first feature maps are directly used as the M2 second feature maps.

Figure 7:
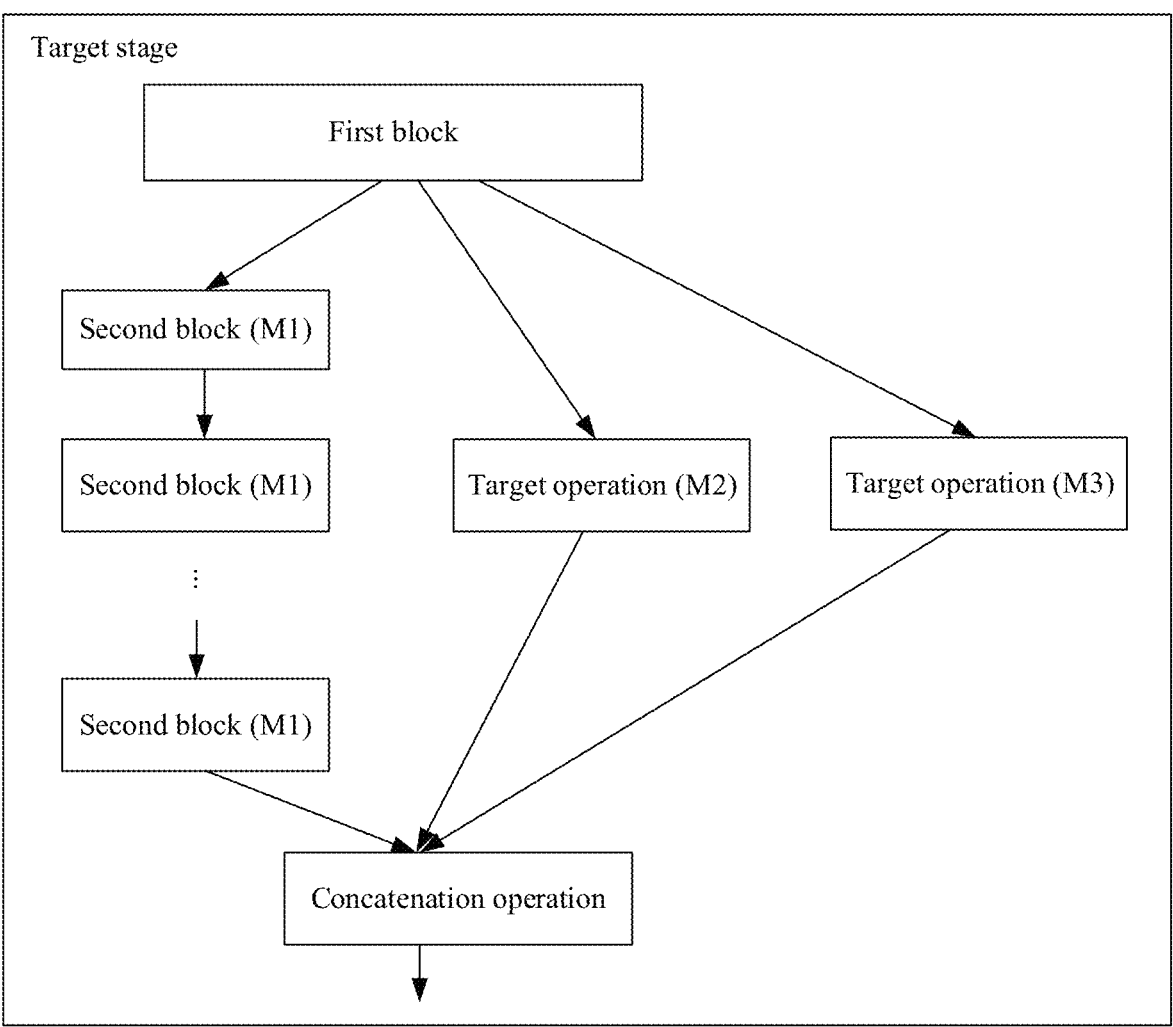

It should be understood that, as shown in FIG. 7, an output feature map of the first block may be further split into a plurality of groups of feature maps, and a plurality of target operations are used to process one group of feature maps, provided that a sum of a quantity of channels of a feature map output by using each target operation and a quantity of channels of a feature map output by the at least one second block is the same as a quantity of channels of a feature map output by the first block. Quantities of channels of feature maps output by using different target operations may be different.

In a possible implementation, the first block and the M second blocks are blocks in a target stage in the feature extraction network, and the concatenated feature map is used as an output feature map of the target stage in the feature extraction network; or the target stage further includes at least one third block, and the at least one third block is configured to perform a convolution operation on the concatenated feature map, to obtain an output feature map of the target stage.

Figure 8:
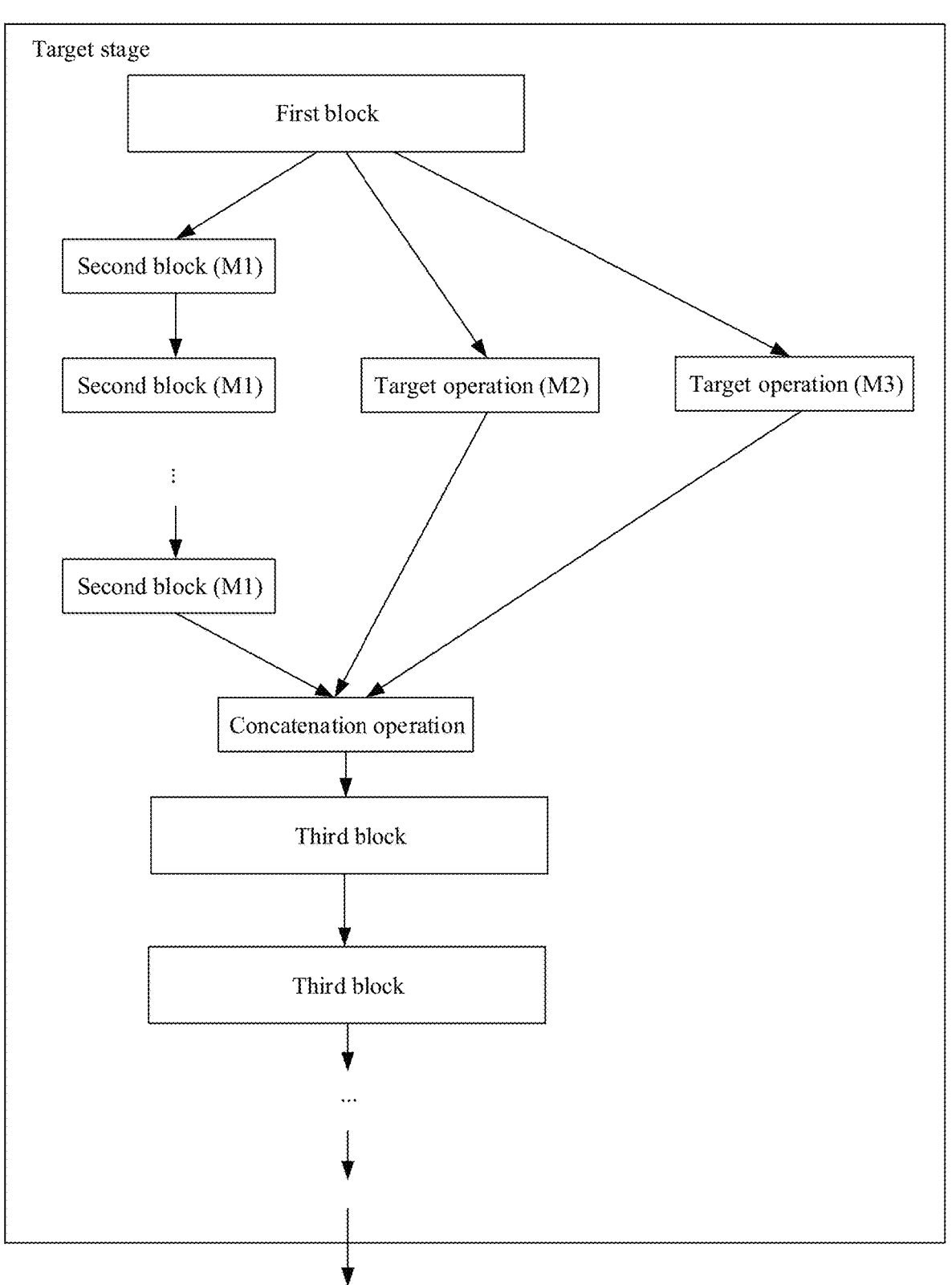

In this embodiment of this disclosure, the concatenated feature map may be used as an output feature map of the target stage, or the concatenated feature map may be further processed by another block (the third block) included in the target stage. For example, as shown in FIG. 8, the concatenated feature map may be further processed by the at least one third block, to obtain the output feature map of the target stage.

Figure 9:
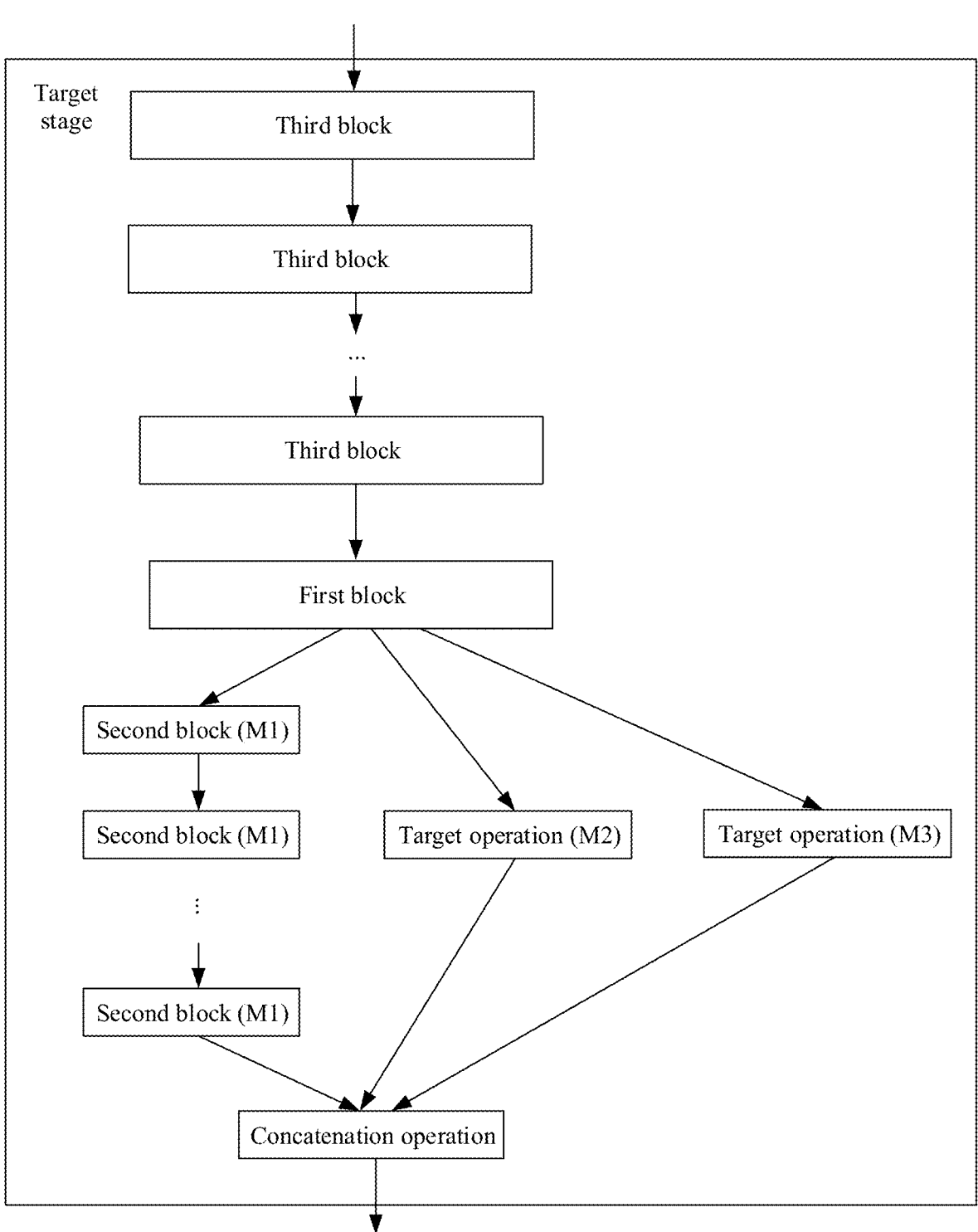

In a possible implementation, the first block may be a Pt block in the feature extraction network, or a block at an intermediate layer. Refer to FIG. 9. At least one third block may be further connected before the first block. In this case, the first block is configured to perform convolution processing on data output by the at least one third block.

In a possible implementation, the at least one second block is configured to perform convolution processing on the M1 target feature maps in the M target feature maps, to obtain a feature map output by each second block, where an output of a second block that is farthest from the first block in the at least one second block is the M1 first feature maps; a fusion operation is used to fuse the feature map output by each second block, to obtain a fused feature map, where a size of the fused feature map is the same as a size of the M2 second feature maps; and an addition operation is performed on the fused feature map and the M2 second feature maps, to obtain processed M2 second feature maps; and the concatenation operation is used to concatenate the M1 first feature maps and the processed M2 second feature maps, to obtain the concatenated feature map.

Figure 10:
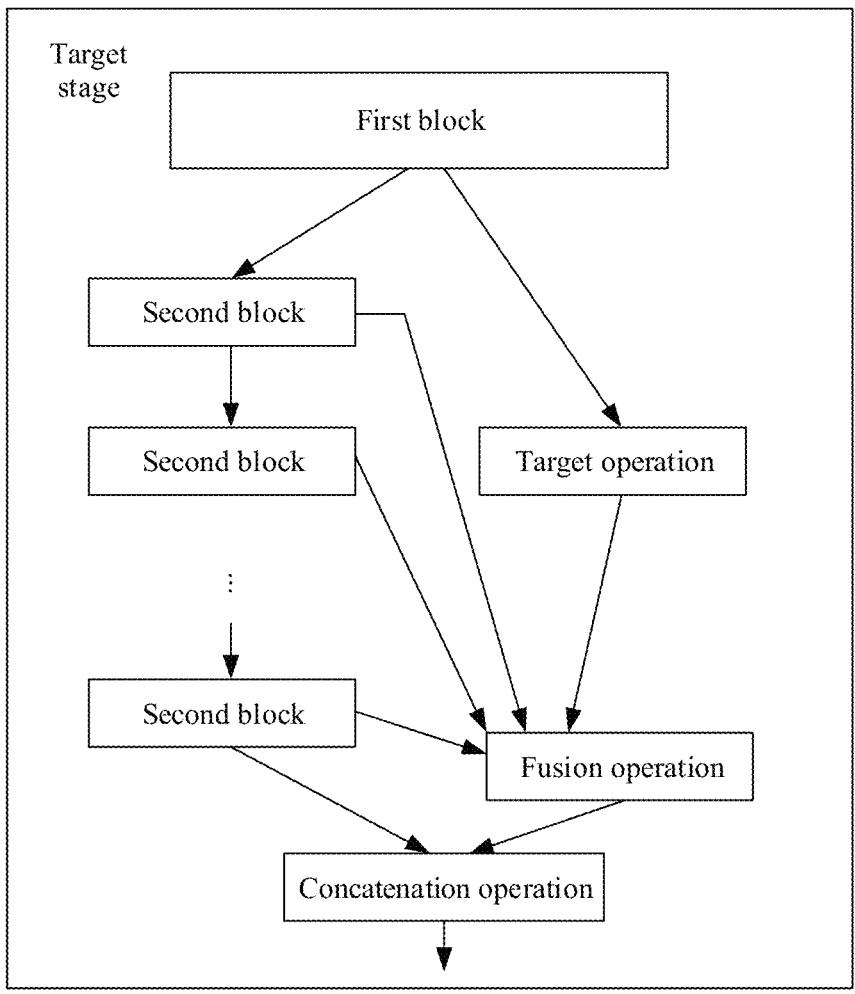

Refer to FIG. 10. Each second block may output one feature map, and an object of the fusion operation is a feature map output by each second block and an output (M2 second feature maps) of the target operation. The fusion operation is used to perform concatenation and dimension reduction operations on an output of each second block, to obtain the fused feature map whose size is same as the size of the M2 second feature maps.

Figure 11:
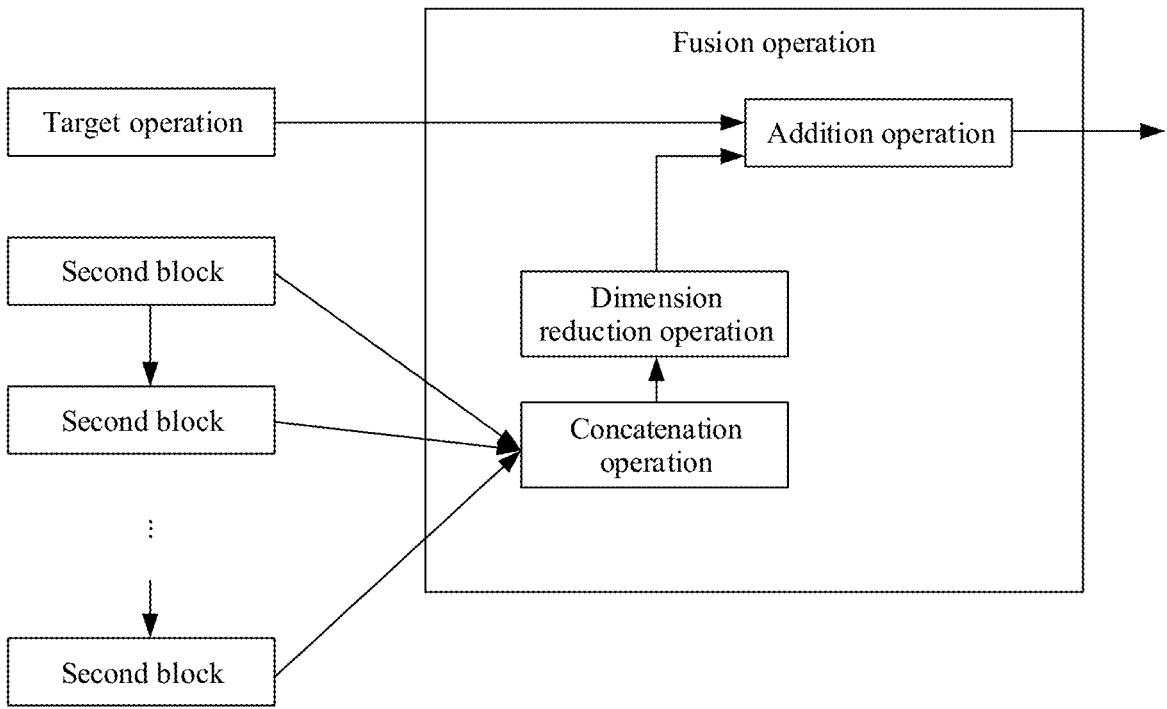

For details, refer to FIG. 11. A concatenation operation may be performed on the feature map output by each second block, to obtain the concatenated feature map (a quantity of channels is a sum of feature maps output by each second block). Because a quantity of channels of the concatenated feature map is greater than a quantity (M2) of channels of a feature map output by using the target operation, to perform an addition operation on the concatenated feature map and an output (M2 second feature maps) of the target operation, a dimension reduction operation needs to be performed on the concatenated feature map, so that a quantity of channels of the concatenated feature map is equal to M2, and a matrix addition operation may be performed on the concatenated feature map and the output of the target operation.

For example, a quantity of second blocks is 5. In this case, outputs of a total of five second blocks are fused into a final output. Five features are first concatenated into Z=[Y1, Y2, Y3, Y4, Y5], and then a dimension reduction operation is performed on the feature Z, so that a quantity of dimensions of the feature Z is the same as M2 and the quantity and M2 are added. A specific formula may be as follows:

$$\tau(Z) = W_2\sigma(W_1\text{Pooling}(Z) + b_1) + b_2, \ Y_n^2 \leftarrow Y_n^2 + \tau(Z),$$

In this embodiment of this disclosure, the feature extraction network in the perception network may be formed by stacking the stages provided in the foregoing embodiment. For example, an example of a network structure may be shown in Table 1. Herein, output indicates a size of an output feature map, and #out indicates a quantity of channels of the output feature map (a quantity of channels of Block and a quantity of channels of Cheap each are actually ½ of the quantity of channels of #out).

TABLE 1

| stage | output | operator | #out | stride |
|-------|--------|----------|------|--------|
| stem | 112 × 112 | Conv3 × 3 | 16 | 2 |
| 1 | 56 × 56 | Block | 24 | 2 |
|  | 56 × 56 | Block × 1 Cheap | 24 | 1 |
|  | 56 × 56 | Concat | 24 | 1 |
| 2 | 28 × 28 | Block | 40 | 2 |
|  | 28 × 28 | Block × 1 Cheap | 40 | 1 |
|  | 28 × 28 | Concat | 40 | 1 |
| 3 | 14 × 14 | Block | 80 | 2 |
|  | 14 × 14 | Block × 5 Cheap | 80 | 1 |
|  | 14 × 14 | Concat | 80 | 1 |
| 4 | 7 × 7 | Block | 160 | 1 |
|  | 7 × 7 | Block × 5 Cheap | 160 | 1 |
|  | 7 × 7 | Concat | 160 | 1 |
| head | 7 × 7 | Conv1 × 1 | 960 | 1 |
|  | 1 × 1 | Pool & Conv1 × 1 | 1280 | 1 |
|  | 1 × 1 | FC | 1000 | – |

In a possible implementation, the feature extraction network is configured to: obtain an input image, perform feature extraction on the input image, and output a feature map of the input image; and the perception network further includes a task network, configured to process a corresponding task based on the feature map of the input image, to obtain a processing result. The task includes an image processing task such as target detection, image segmentation, or image classification.

The following describes an example structure of the perception network.

Refer to FIG. 11. The feature extraction network in an embodiment of this disclosure may be a backbone network shown in FIG. 11. A feature pyramid network (FPN) is connected to the backbone network. The FPN may perform convolution processing on a plurality of feature maps with different resolutions generated by the backbone network, to construct a feature pyramid.

Figure 12:
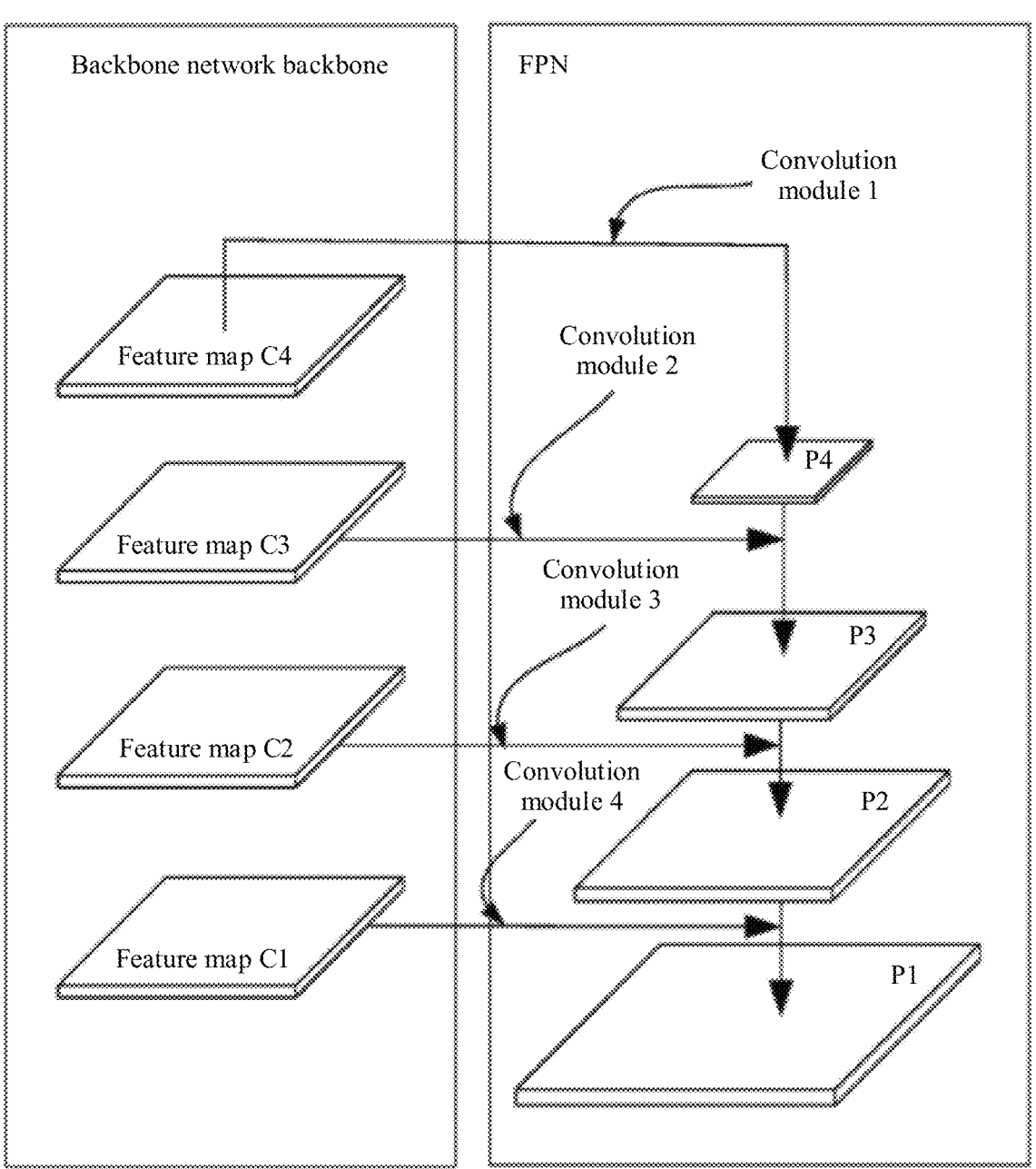

FIG. 12 is a schematic diagram of a structure of an FPN. A convolution module 1 is used to process a topmost feature map C4, and the convolution module 1 may include at least one convolutional layer. For example, the convolution module 1 may reduce a quantity of channels of the topmost feature map C4 to 256 through a dilated convolution and a 1×1 convolution, to serve as a topmost feature map P4 of a feature pyramid. After an output result of a feature map C3 at a next layer of the topmost layer is laterally connected and a quantity of channels is reduced to 256 through a 1×1 convolution (a convolution module 2), a feature map obtained after the quantity of channels is reduced to 256 and a feature map p4 are added pixel by pixel, to obtain a feature map p3. By analogy, a feature pyramid $\Phi_p$={feature map p4, feature map p3, feature map p2, feature map p1} is constructed from top to bottom.

In this embodiment of this disclosure, the FPN includes a plurality of convolution modules, each convolution module includes a plurality of convolutional layers, and each convolution module may perform convolution processing on an input feature map. In this embodiment of this disclosure, a second convolutional layer included in the FPN is one of a plurality of convolutional layers included in the FPN.

It should be noted that the FPN shown in FIG. 12 is merely an implementation, and does not constitute a limitation on this disclosure.

Figure 13:
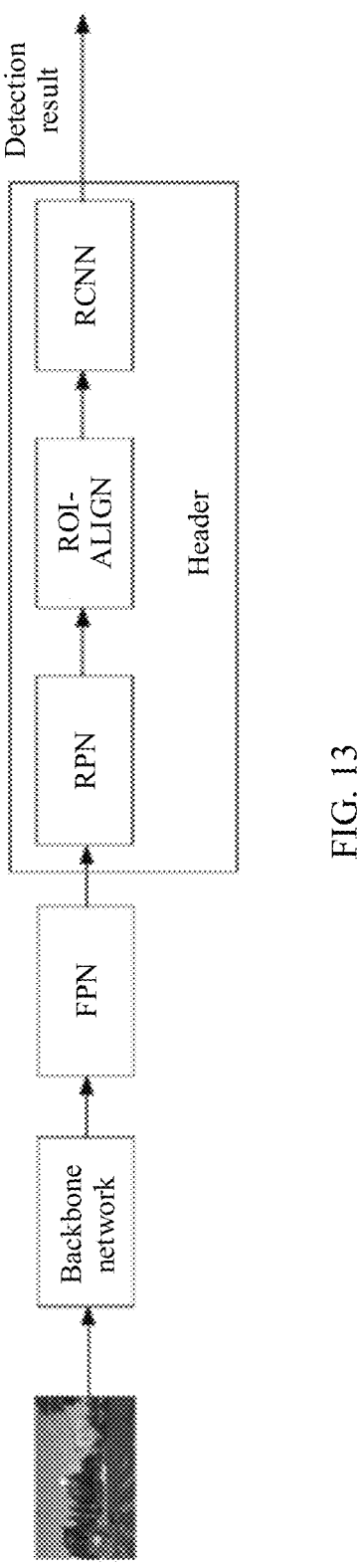

In this embodiment of this disclosure, an example in which a task to be implemented by the task network is target detection is used. A header is connected to the FPN. The header may complete detection of a 2D box of a task based on a feature map provided by the FPN, and output a 2D box of an object of the task, a corresponding confidence, and the like. The following describes an example structure of the header. FIG. 13 is a schematic diagram of a header. As shown in FIG. 13, the header includes three modules: a region proposal network (RPN) module, a ROI-ALIGN module, and an RCNN module.

The RPN module may be configured to: predict, on one or more feature maps provided by the FPN, a region in which the object of the task is located, and output a 2D proposal box matching the region. Alternatively, it may be understood that the RPN predicts, on one or more horizontal images output by the FPN, the region in which the object of the task exists, and provides a box of the region. The region is referred to as a proposal region. For example, when the header is responsible for detecting a vehicle, an RPN layer of the header predicts a proposal box in which a vehicle may exist. When the header is responsible for detecting a person, the RPN layer of the header predicts a proposal box in which a person may exist. Certainly, these proposals are inaccurate. The proposals do not necessarily include the object of the task, and the boxes are not compact.

The 2D proposal region prediction procedure may be implemented by the RPN module of the header. The RPN module predicts, based on a feature map provided by the FPN, the region in which the object of the task may exist, and provides a proposal box (which may also be referred to as a proposal region, namely, a proposal) of the region. In this embodiment, if the header is responsible for detecting a vehicle, the RPN layer of the header predicts a proposal box in which a vehicle may exist.

Figure 14:
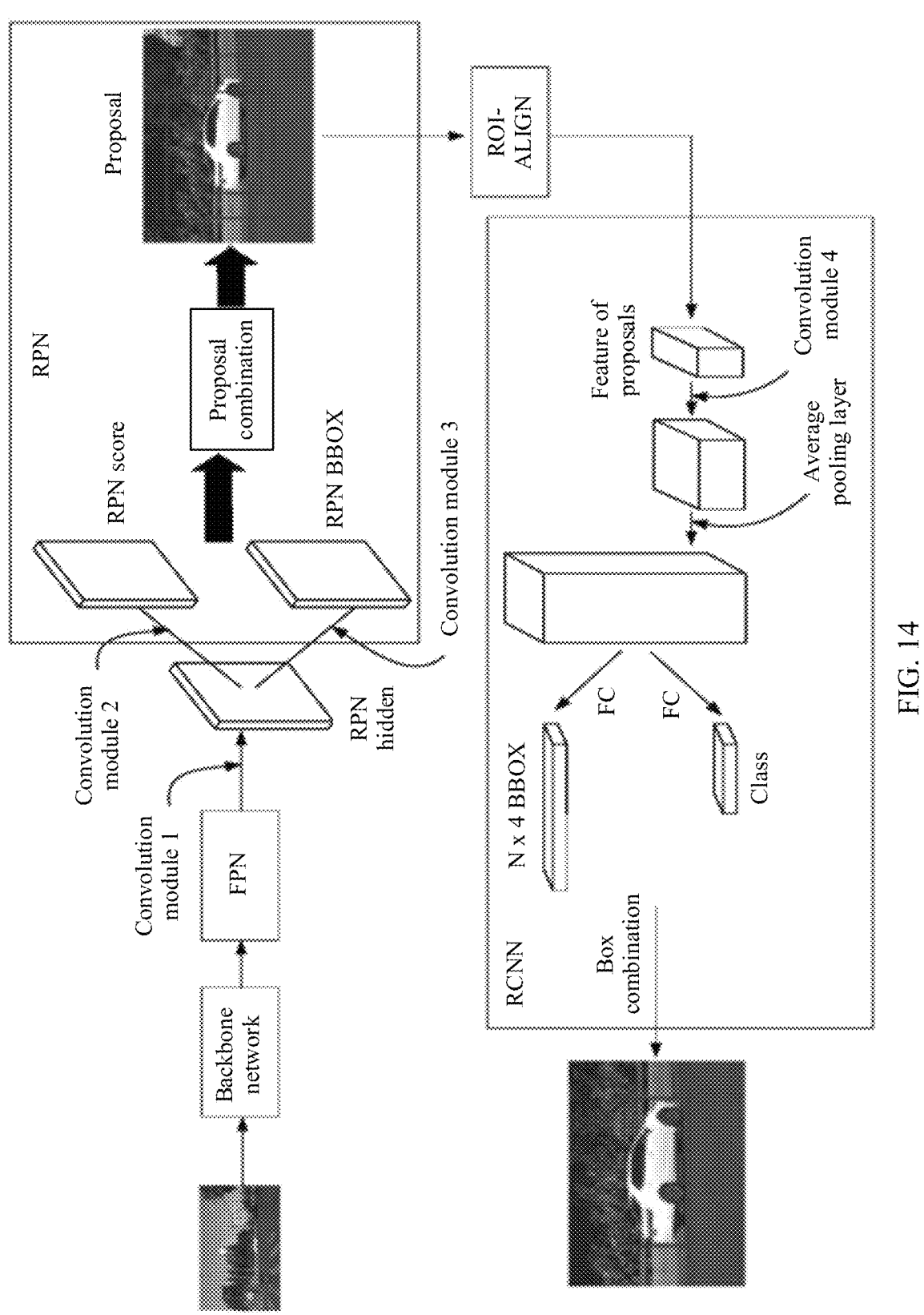

Refer to FIG. 14. A feature map RPN Hidden is generated on the feature map provided by the FPN by using the convolution module 1 (for example, a 3×3 convolution). The following RPN layer of the header predicts a proposal from the RPN Hidden. Specifically, the RPN layer of the header separately predicts coordinates and a confidence of a proposal at each location of the RPN Hidden by using the convolution module 2 and a convolution module 3 (for example, each are a 1×1 convolution). A higher confidence indicates a higher probability that the object of the task exists in the proposal. For example, a higher score of a proposal in the header indicates a higher probability that a vehicle exists in the proposal. A proposal predicted by each RPN layer needs to pass through a proposal combination module. A redundant proposal is removed based on an overlapping degree between proposals (this process can be performed by using but not limited to an NMS algorithm). N (N<k) proposals with a highest score are selected from remaining K proposals as proposal regions in which an object may exist. It can be learned from FIG. 14 that these proposals are inaccurate. The proposals do not necessarily include the object of the task, and the boxes are not compact. Therefore, the RPN module only performs a coarse detection process, and the following RCNN module needs to perform fine classification. When the RPN module regresses to the coordinates of the proposal, the RPN does not directly regress to absolute values of the coordinates, but regresses to coordinates relative to an anchor. A higher degree of matching between an anchor and an actual object indicates a higher probability that the RPN detects the object. The N (N<k) proposals are proposal regions in which an object may exist.

The ROI-ALIGN module is configured to extract, based on the region predicted by the RPN module and from the feature map provided by the FPN, a feature of a region in which the 2D proposal box is located. In other words, the ROI-ALIGN module extracts, from a feature map based on a proposal provided by the RPN module, a feature of a region in which each proposal is located, and resizes the feature to a fixed size, to obtain a feature of each proposal. It can be understood that the ROI-ALIGN module may use a feature extraction method including but not limited to ROI-POOLING (region of interest pooling)/ROI-ALIGN (region of interest extraction)/PS-ROIPOOLING (position-sensitive region of interest pooling)/PS-ROIALIGN (position-sensitive region of interest extraction).

The RCNN module is configured to: perform, by using a neural network, convolution processing on the feature of the region in which the 2D proposal box is located, to obtain a confidence of each object category to which the 2D proposal box belongs; adjust coordinates of a 2D box of the region proposal by using the neural network, so that an adjusted 2D proposal box better matches a shape of an actual object than the 2D proposal box; and select, as the 2D box of the region, an adjusted 2D proposal box whose confidence is higher than a preset threshold. That is, the RCNN module mainly performs detailed processing on a feature of each proposal proposed by the ROI-ALIGN module, to obtain a confidence of each category to which each proposal (for example, for a vehicle task, four scores corresponding to Background/Car/Truck/Bus are provided) belongs. In addition, coordinates of 2D boxes of the proposals are adjusted, to output more compact 2D boxes. These 2D boxes are combined through non-maximum suppression (non-maximum suppression, NMS), and then are output as a final 2D box.

2D proposal region sub-classification is mainly implemented by the RCNN module of the header in FIG. 14. The RCNN module further regresses to coordinates of a more compact 2D box based on the feature of each proposal extracted by the ROI-ALIGN module, classifies the proposal, and outputs a confidence of each category to which the proposal belongs. The RCNN has a plurality of implementable forms, and one implementation form is shown in FIG. 13. A size of a feature output by the ROI-ALIGN module may be N×14×14×256 (Feature of proposals). The feature is first processed by a convolution module 4 (Res18-Conv5) of Resnet18 in the RCNN module. A size of an output feature is N×7×7×512. Then, Global Avg Pool (average pooling layer) is used for processing. The 7×7 features on each channel in an input feature are averaged, to obtain N×512 features. Each 1×512-dimensional feature vector represents a feature of each proposal. Then, two fully connected layers FC are used to separately regress to precise coordinates of a box (an N×4 vector is output and the four values respectively indicate x/y coordinates of a center point of the box and a width and a height of the box) and a confidence of a category of the box (a score corresponding to Background/Car/Truck/Bus of the box needs to be provided in a header 0). Finally, several boxes with a highest score are selected through a box combination operation, and a duplicate box is removed through an NMS operation, to obtain an output of a compact box.

In some actual application scenarios, the perception network may further include another header, and 3D/mask/keypoint detection may be further performed on the basis of detecting a 2D box. 3D is used as an example. The ROI-ALIGN module extracts, based on an accurate 2D box provided by the header and from the feature map output by the FPN, a feature of a region in which each 2D box is located. It is assumed that there are M 2D boxes. Then, the size of the feature output by the ROI-ALIGN module is M×14×14×256. The feature is first processed by a convolution module 5 (for example, Res18-Conv5) of Resnet18, and a size of an output feature is N×7×7×512. Then, Global Avg Pool (average pooling layer) is used for processing, and 7×7 features on each channel in an input feature are averaged, to obtain M×512 features. Each 1×512-dimensional feature vector represents a feature of each 2D box. Then, three fully connected layers FC are used to separately regress to an orientation (orientation, an M×1 vector) of an object in the box, coordinates of a centroid (centroid, an M×2 vector, where the two values each represent an x/y coordinate of the centroid), and a length, width and height (dimension).

In this embodiment of this disclosure, the header includes at least one convolution module, each convolution module includes at least one convolutional layer, and each convolution module may perform convolution processing on an input feature map. In this embodiment of this disclosure, a third convolutional layer included in the header is one of a plurality of convolutional layers included in the header.

It should be noted that the headers shown in FIG. 13 and FIG. 14 are merely implementations, and do not constitute a limitation on this disclosure.

The following describes an effect of the perception network provided in this embodiment of this disclosure.

In this embodiment of this disclosure, results of an image classification dataset CIFAR-10 may be shown in Table 2 and Table 3. Compared with another method such as ResNet, the structure of the perception network provided in this embodiment of this disclosure achieves high precision in a case of a minimum calculation amount and a minimum quantity of parameters. Table 2 shows a result of the image classification dataset CIFAR-10, and Table 3 shows a comparison between the image classification dataset CIFAR-10 and an existing lightweight network.

TABLE 2

| Model | FLOPs (M) | Params (M) | Acc (%) |
|---|---|---|---|
| ResNet56 | 125.0 | 0.85 | 94.14 ± 0.48 |
| ResNet56-0.7x | 63.3 | 0.41 | 93.15 ± 0.33 |
| GhostV2 w/o mix | 53.7 | 0.36 | 93.67 ± 0.27 |
| GhostV2 w/mix | 53.8 | 0.37 | 93.93 ± 0.21 |

TABLE 4

| Model | FLOPs (B) | Params (M) | Latency (ms) | Top1 (%) | Top5 (%) |
|---|---|---|---|---|---|
| ResNet34 | 3.7 | 21.8 | 29.1 | 73.3 | 91.4 |
| ResNet34-0.8x | 2.3 | 14.0 | 24.2 | 71.7 | 90.3 |
| GhostV2 w/o mix | 2.3 | 14.3 | 24.1 | 72.8 | 90.9 |
| GhostV2 w/mix | 2.3 | 14.6 | 24.5 | 73.1 | 91.2 |

TABLE 5

| Model | FLOPs (B) | Params (M) | Latency (ms) | Top1 (%) | Top5 (%) |
|---|---|---|---|---|---|
| RegNetX-3.2GF | 3.2 | 15.3 | 59.09 | 78.2 | 94.0 |
| RegNetX-3.2GF-0.75x | 1.8 | 8.8 | 46.06 | 76.3 | 93.0 |
| Ghost V2 w/o mix | 1.8 | 9.7 | 43.88 | 76.8 | 93.2 |
| GhostV2 w/mix | 1.8 | 10.5 | 44.37 | 77.4 | 93.7 |

TABLE 6

| Model | FLOPS | Params | CPU Latency | GPU Latency | Top-1 | Top-5 |
|---|---|---|---|---|---|---|
| MobileNetV2 1.0x [34] | 300M | 3.5M | 50.5 ms | 18.8 ms | 71.8% | 91.0% |
| MobileNetV3-Large 0.75x [13] | 155M | 4.0M | 32.2 ms | 16.4 ms | 73.3% | — |
| GhostNetV1-1.0x [7] | 141M | 5.2M | 31.1 ms | 17.2 ms | 73.9% | 91.4% |
| GhostNetV2-1.25x | 206M | 5.1M | 42.2 ms | 14.8 ms | 74.1% | 91.6% |
| MobileNetV3-Large 1.0x [13] | 219M | 5.4M | 46.4 ms | 19.1 ms | 75.2% | — |
| GhostNetV1-1.3x [7] | 226M | 7.3M | 46.9 ms | 21.3 ms | 75.7% | 92.7% |
| GhostNetV2-1.5x | 295M | 6.3M | 61.7 ms | 17.9 ms | 75.7% | 92.7% |
| MobileNetV2 1.4x [34] | 582M | 6.1M | 81.6 ms | 28.0 ms | 75.0% | 92.5% |
| MobileNetV3-Large 1.25x [7] | 356M | 7.5M | 66.3 ms | 25.5 ms | 76.6% | — |
| GhostNetV1-1.65x [7] | 351M | 10.5M | 67.4 ms | 27.9 ms | 76.9% | 93.2% |
| EfficientNet-B0 [37]† | 388M | 5.3M | 78.6 ms | 26.9 ms | 77.1% | 93.3% |
| GhostNetV2-2.0x | 466M | 9.2M | 87.7 ms | 22.8 ms | 76.9% | 93.3% |
| GhostNetV2-2.0x + RA† | 466M | 9.2M | 87.7 ms | 22.8 ms | 77.4% | 93.6% |

TABLE 3

| Model | FLOPs (M) | Params (M) | Acc (%) |
|---|---|---|---|
| ResNet56 | 125.0 | 0.85 | 94.24 ± 0.48 |
| GAL [25] | 78.3 | 0.75 | 92.98 |
| FPGM [11] | 59.4 | — | 93.49 ± 0.13 |
| LEGR [2] | 58.9 | — | 93.7 ± 0.2 |
| HRank [24] | 62.7 | 0.49 | 93.17 |
| GhostV2 w/mix | 53.8 | 0.37 | 93.93 ± 0.21 |

Results of the image classification dataset ImageNet in the perception network provided in this embodiment of this disclosure may be shown in Table 4, Table 5, and Table 6. Compared with a baseline network ResNet with a same inference speed, the perception network provided in this embodiment of this disclosure can improve inference precision by 1.4% on a large classification dataset. Compared with another series of lightweight inference networks, the perception network provided in this embodiment of this disclosure can achieve both a fastest inference speed and high inference precision. Table 4 shows a comparison between an image classification dataset ImageNet and a baseline network ResNet, Table 5 shows a comparison between an image classification dataset ImageNet and another baseline network RegNet, and Table 6 shows a comparison between an image classification dataset ImageNet and another lightweight network.

For example, the task to be implemented by the task network is target detection. An experiment result may be shown in Table 7. While achieving highest Mean Average Precision (mAP), the perception network provided in this embodiment of this disclosure has a highest inference speed that achieves 25.9 frames per second.

TABLE 7

| Backbone | mAP | $AP_S$ | $AP_M$ | $AP_L$ | $FLOP_S$ | FPS |
|---|---|---|---|---|---|---|
| RegNetX-3.2GF | 39.1 | 22.6 | 43.5 | 50.8 | 3.2B | 21.9 |
| ResNet50 | 36.8 | 20.5 | 40.6 | 48.5 | 4.1B | 22.4 |
| ResNeXt50 | 37.6 | 21.1 | 41.4 | 49.4 | 4.2B | 19.6 |
| RegNetX-3.2GF-0.75x | 37.7 | 21.2 | 41.6 | 49.5 | 1.8B | 25.2 |
| Ghost V2-RegNetX-3.20P | 38.4 | 22.3 | 42.3 | 50.1 | 1.8B | 25.9 |

This embodiment of this disclosure provides the perception network. The perception network includes the feature extraction network. The feature extraction network includes the first block, the at least one second block connected in series, the target operation, and the concatenation operation. The first block and M second blocks are blocks in a same stage in the feature extraction network, and the quantity of parameters of the target operation is less than the quantity of parameters of the M second blocks. The first block is configured to perform convolution processing on the input data, to obtain the M target feature maps. Each target feature map corresponds to one channel. The at least one second block is configured to perform convolution processing on the M1 target feature maps in the M target feature maps, to obtain the M1 first feature maps, where M1 is less than M. The target operation is used to process the M2 target feature maps in the M target feature maps, to obtain the M2 second feature maps, where M2 is less than M. The concatenation operation is used to concatenate the M1 first feature maps and the M2 second feature maps, to obtain the concatenated feature map. In the foregoing manner, the cross-layer target operation in a same stage is used to enable the perception network to generate the feature that has a high similarity to the key feature, to reduce the quantity of parameters of the model, and improve the running speed of the model on the GPU device, the TPU device, and the NPU device.

The following describes several application scenarios of embodiments of this disclosure from a perspective of a product application.

Embodiments of this disclosure are mainly applied to fields based on computer vision such as a terminal mobile phone, a cloud service, detection, segmentation, and bottom-layer vision. For parallel computing of massive data, computer vision and a related task of computer vision have a higher requirement on computing power, and impose a higher requirement on a hardware computing speed and power consumption. Currently, a large quantity of GPUs and NPG processing units have started to be deployed on more terminal devices such as a mobile phone chip. A lightweight network model provided in embodiments of this disclosure can greatly improve an inference speed on the GPU, and may be used as a basic network to directly replace an existing basic feature extraction network such as a target detector, and is deployed in a scenario such as autonomous driving. In an actual application, the lightweight network model may adapt to wide application scenarios and devices (for example, a mobile phone terminal and a cloud server), and a fast inference network is used to perform tasks such as data processing and image retrieval.

In a scenario, embodiments of this disclosure may be deployed on the mobile phone terminal, to provide efficient and accurate inference for a user, for example, image processing, image recognition, and target detection on a mobile phone end after photographing performed by using a mobile phone.

In a scenario, in the present invention, lightweight deployment may be performed on a cloud server, to provide the user with an efficient data processing service, and help accelerate deep learning and improve efficiency of deep learning. The user uploads to-be-processed data, to quickly process the data by using an inference model on the cloud server.

In a scenario, in an autonomous driving task, real-time detection of a target such as a pedestrian or a vehicle in a field of view is critical to making a correct driving decision for the vehicle. In the present invention, the feature extraction module of the existing target detector may be directly replaced, to compress and accelerate an inference process of the detector.

Figure 4:
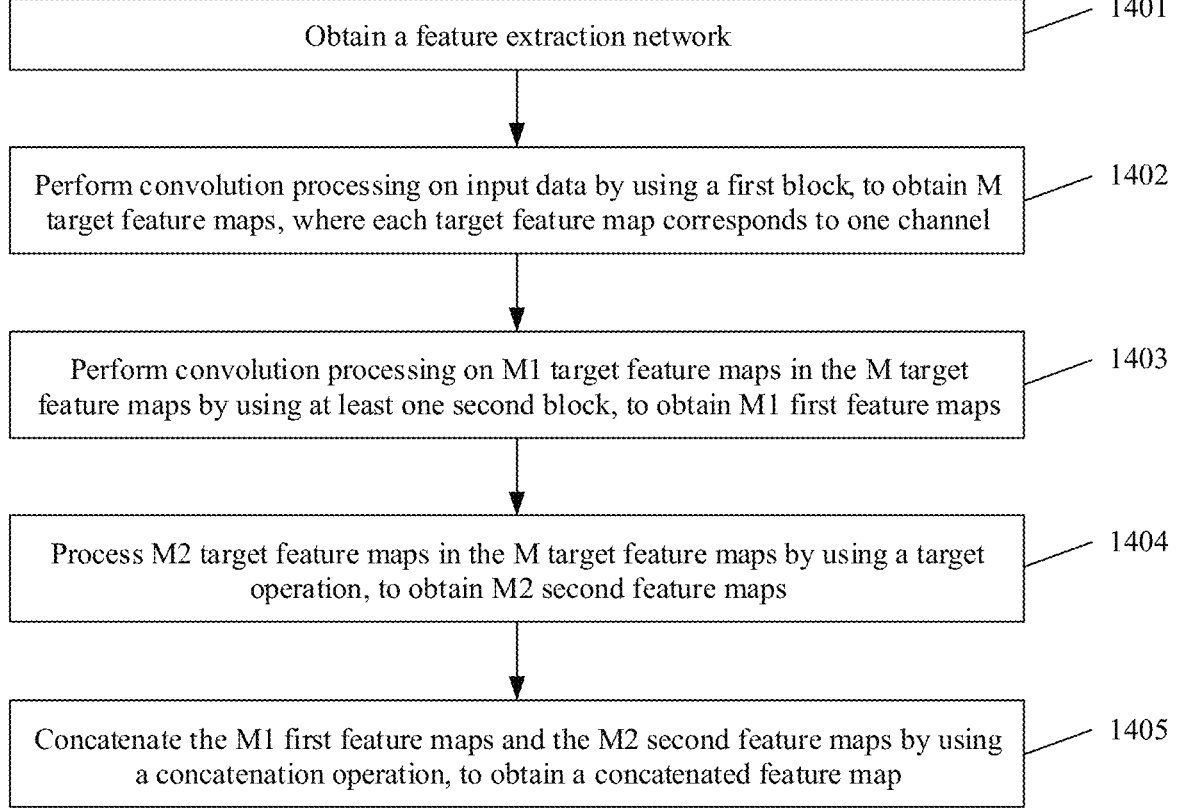
FIG. 4 is a schematic diagram of an embodiment of a data processing method according to an embodiment of this disclosure.

Refer to FIG. 4. An embodiment of this disclosure further provides a data processing method. The method includes the following steps.

1401: Obtain a feature extraction network, where the feature extraction network includes a first block, at least one second block connected in series, a target operation, and a concatenation operation, the first block and M second blocks are blocks in a same stage in the feature extraction network, and a quantity of parameters of the target operation is less than a quantity of parameters of the M second blocks.

For a specific description of step 1401, refer to the descriptions of the feature extraction network in the foregoing embodiments. Details are not described herein again.

1402: Perform convolution processing on input data by using the first block, to obtain M target feature maps, where each target feature map corresponds to one channel.

For a specific description of step 1402, refer to the descriptions of the first block in the foregoing embodiments. Details are not described herein again.

1403: Perform convolution processing on M1 target feature maps in the M target feature maps by using the at least one second block, to obtain M1 first feature maps, where M1 is less than M.

For a specific description of step 1403, refer to the descriptions of the at least one second block in the foregoing embodiments. Details are not described herein again.

1404: Process M2 target feature maps in the M target feature maps by using the target operation, to obtain M2 second feature maps, where M2 is less than M.

For a specific description of step 1404, refer to the descriptions of the target operation in the foregoing embodiments. Details are not described herein again.

1405: Concatenate the M1 first feature maps and the M2 second feature maps by using the concatenation operation, to obtain a concatenated feature map.

For a specific description of step 1405, refer to the descriptions of the concatenation operation in the foregoing embodiments. Details are not described herein again.

In a possible implementation, an intersection set of the M1 target feature maps and the M2 target feature maps is empty, a sum of M1 and M2 is M, and a quantity of channels of the concatenated feature map is M.

In a possible implementation, the target operation is a convolution operation whose quantity of parameters is less than a quantity of parameters of the at least one second block; or the target operation is a residual connection operation between an output of the first block and an output of the concatenation operation.

In a possible implementation, the at least one second block is configured to perform convolution processing on the M1 target feature maps in the M target feature maps, to obtain a feature map output by each second block, where an output of a second block that is farthest from the first block in the at least one second block is the M1 first feature maps; the method further includes:

fusing the feature map output by each second block by using a fusion operation, to obtain a fused feature map, where a size of the fused feature map is the same as a size of the M2 second feature maps; and performing an addition operation on the fused feature map and the M2 second feature maps, to obtain processed M2 second feature maps; and the concatenating the M1 first feature maps and the M2 second feature maps by using the concatenation operation includes:

concatenating the M1 first feature maps and the processed M2 second feature maps, to obtain the concatenated feature map.

In a possible implementation, the fusing the feature map output by each second block by using a fusion operation includes:

performing concatenation and dimension reduction operations on an output of each second block by using the fusion operation, to obtain the fused feature map whose size is same as the size of the M2 second feature maps.

In a possible implementation, the first block and the M second blocks are blocks in a target stage in the feature extraction network, and the concatenated feature map is used as an output feature map of the target stage in the feature extraction network; or the target stage further includes at least one third block, and the at least one third block is configured to perform a convolution operation on the concatenated feature map, to obtain an output feature map of the target stage.

In a possible implementation, the feature extraction network is configured to: obtain an input image, perform feature extraction on the input image, and output a feature map of the input image; and the method further includes:

processing a corresponding task based on the feature map of the input image by using a task network, to obtain a processing result.

In a possible implementation, the task includes target detection, image segmentation, or image classification.

Figure 15:
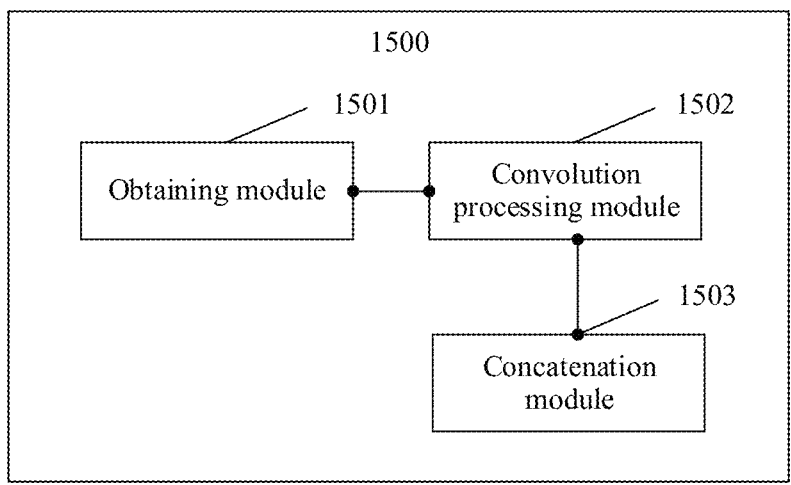
FIG. 15 is a schematic diagram of a data processing apparatus according to an embodiment of this disclosure.

FIG. 15 is a schematic diagram of a data processing apparatus 1500 according to an embodiment of this disclosure. As shown in FIG. 15, the data processing apparatus 1500 provided in this disclosure includes:

an obtaining module 1501, configured to obtain a feature extraction network, where the feature extraction network includes a first block, at least one second block connected in series, a target operation, and a concatenation operation, the first block and M second blocks are blocks in a same stage in the feature extraction network, and a quantity of parameters of the target operation is less than a quantity of parameters of the M second blocks;

a convolution processing module 1502, configured to:

perform convolution processing on input data by using the first block, to obtain M target feature maps, where each target feature map corresponds to one channel;

perform convolution processing on M1 target feature maps in the M target feature maps by using the at least one second block, to obtain M1 first feature maps, where M1 is less than M; and process M2 target feature maps in the M target feature maps by using the target operation, to obtain M2 second feature maps, where M2 is less than M; and a concatenation module 1503, configured to concatenate the M1 first feature maps and the M2 second feature maps by using the concatenation operation, to obtain a concatenated feature map.

In a possible implementation, an intersection set of the M1 target feature maps and the M2 target feature maps is empty, a sum of M1 and M2 is M, and a quantity of channels of the concatenated feature map is M.

In a possible implementation, the target operation is a convolution operation whose quantity of parameters is less than a quantity of parameters of the at least one second block; or the target operation is a residual connection operation between an output of the first block and an output of the concatenation operation.

In a possible implementation, the at least one second block is configured to perform convolution processing on the M1 target feature maps in the M target feature maps, to obtain a feature map output by each second block, where an output of a second block that is farthest from the first block in the at least one second block is the M1 first feature maps;

the apparatus further includes:

a fusion module, configured to fuse the feature map output by each second block by using a fusion operation, to obtain a fused feature map, where a size of the fused feature map is the same as a size of the M2 second feature maps; and perform an addition operation on the fused feature map and the M2 second feature maps, to obtain processed M2 second feature maps; and the concatenation module is configured to concatenate the M1 first feature maps and the processed M2 second feature maps, to obtain the concatenated feature map.

In a possible implementation, the fusion module is configured to perform concatenation and dimension reduction operations on an output of each second block by using the fusion operation, to obtain the fused feature map whose size is same as the size of the M2 second feature maps.

In a possible implementation, the first block and the M second blocks are blocks in a target stage in the feature extraction network, and the concatenated feature map is used as an output feature map of the target stage in the feature extraction network; or the target stage further includes at least one third block, and the at least one third block is configured to perform a convolution operation on the concatenated feature map, to obtain an output feature map of the target stage.

In a possible implementation, the feature extraction network is configured to: obtain an input image, perform feature extraction on the input image, and output a feature map of the input image; and the apparatus further includes:

a task processing module, configured to process a corresponding task based on the feature map of the input image by using a task network, to obtain a processing result.

In a possible implementation, the task includes target detection, image segmentation, or image classification.

Figure 16:
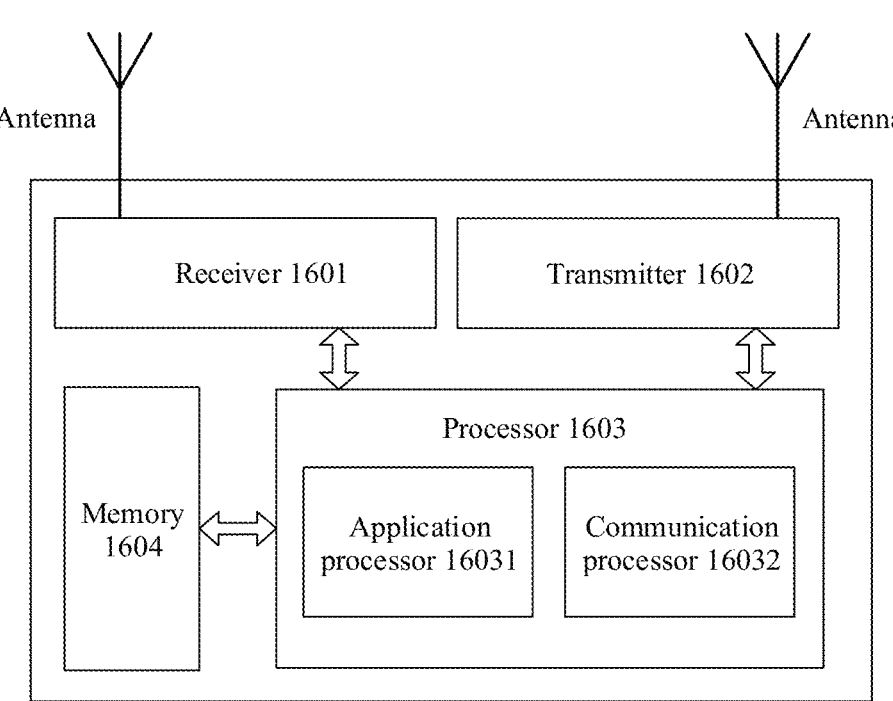
FIG. 16 is a schematic diagram of a structure of an execution device according to an embodiment of this disclosure.

The following describes an execution device provided in an embodiment of this disclosure. FIG. 16 is a schematic diagram of a structure of an execution device according to an embodiment of this disclosure. An execution device 1600 may be specifically represented as a mobile phone, a tablet computer, a notebook computer, an intelligent wearable device, a server, or the like. This is not limited herein. The data processing apparatus described in the embodiment corresponding to FIG. 15 may be deployed on the execution device 1600, and is configured to implement a data processing function in the embodiment corresponding to FIG. Specifically, the execution device 1600 includes a receiver 1601, a transmitter 1602, a processor 1603, and a memory 1604 (there may be one or more processors 1603 in the execution device 1600, and one processor is used as an example in FIG. 11). The processor 1603 may include an application processor 16031 and a communication processor 16032. In some embodiments of this disclosure, the receiver 1601, the transmitter 1602, the processor 1603, and the memory 1604 may be connected through a bus or in another manner.

The memory 1604 may include a read-only memory and a random access memory, and provide instructions and data for the processor 1603. A part of the memory 1604 may further include a nonvolatile random access memory (nonvolatile random access memory, NVRAM). The memory 1604 stores operation instructions to be processed by the processor, an executable module or a data structure, a subnet thereof, or an expanded set thereof. The operation instructions may include various operation instructions, to implement various operations.

The processor 1603 controls an operation of the execution device. In a specific application, components of the execution device are coupled together through a bus system. In addition to a data bus, the bus system may further include a power bus, a control bus, a status signal bus, and the like. However, for clear description, various types of buses in the figure are referred to as the bus system.

The methods disclosed in embodiments of this disclosure may be applied to the processor 1603 or may be implemented by the processor 1603. The processor 1603 may be an integrated circuit chip, and has a signal processing capability. In an implementation process, steps in the method may be implemented by using a hardware integrated logic circuit in the processor 1603, or by using instructions in a form of software. The foregoing processor 1603 may be a processor applicable to AI operation, for example, a general purpose processor, a digital signal processor (DSP), a microprocessor or a microcontroller, a vision processing unit (VPU), or a tensor processing unit (TPU), and may further include an application-specific integrated circuit (ASIC), a field-programmable gate array (FPGA) or another programmable logic device, a discrete gate or a transistor logic device, or a discrete hardware component. The processor 1603 may implement or perform the methods, steps, and logical block diagrams that are disclosed in embodiments of this disclosure. The general purpose processor may be a microprocessor, or the processor may be any conventional processor, or the like. The steps in the methods disclosed with reference to embodiments of this disclosure may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 1604, and the processor 1603 reads information in the memory 1604 and completes the steps in the foregoing methods in combination with hardware of the processor 1603.

The receiver 1601 may be configured to: receive input digit or character information, and generate a signal input related to related settings and functional control of the execution device. The transmitter 1602 may be configured to output the digital or character information through a first interface. The transmitter 1602 may further be configured to send instructions to a disk group through the first interface, to modify data in the disk group. The transmitter 1602 may further include a display device such as a display.

The execution device may run the perception network described in FIG. 6, or perform the data processing method in the embodiment corresponding to FIG. 14.

Figure 17:
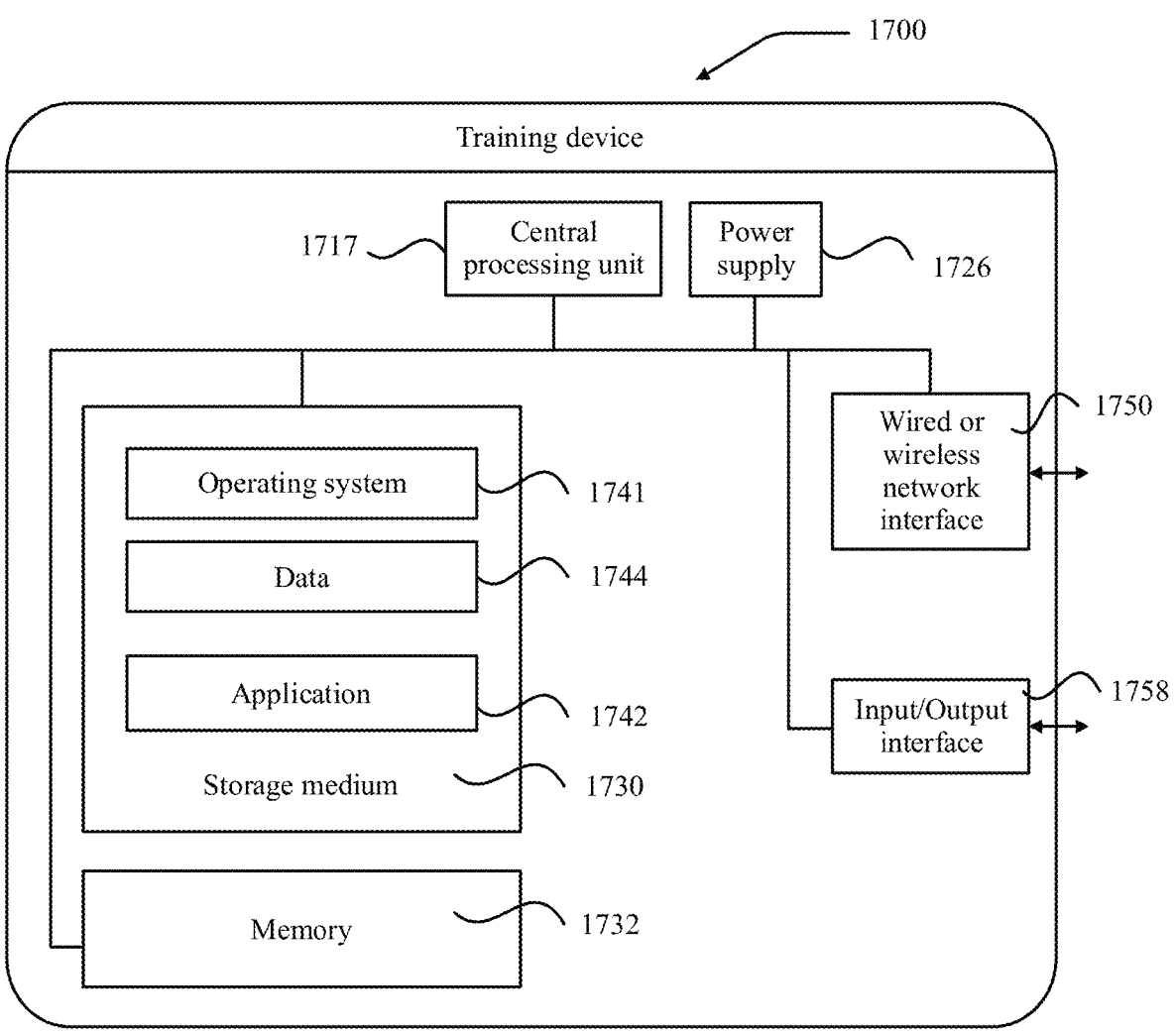
FIG. 17 is a schematic diagram of a structure of a training device according to an embodiment of this disclosure.

An embodiment of this disclosure further provides a training device. FIG. 17 is a schematic diagram of a structure of a training device according to an embodiment of this disclosure. Specifically, the training device 1700 is implemented by one or more servers. The training device 1700 may differ greatly due to different configurations or performance, and may include one or more central processing units (CPUs) 1717 (for example, one or more processors), a memory 1732, and one or more storage media 1730 (for example, one or more massive storage devices) that stores an application 1742 or data 1744. The memory 1732 and the storage medium 1730 may perform transitory storage or persistent storage. The program stored in the storage medium 1730 may include one or more modules (not shown in the figure), and each module may include a series of instruction operations for the training device. Further, the central processing unit 1717 may be configured to: communicate with the storage medium 1730, and perform the series of instruction operations in the storage medium 1730 on the training device 1700.

The training device 1700 may further include one or more power supplies 1726, one or more wired or wireless network interfaces 1750, one or more input/output interfaces 1758, or one or more operating systems 1741 such as Windows Server™, MacOS X™, Unix™, Linux™, and FreeBSD™.

The training device 1700 described in FIG. 17 may be a module in the training device, and the processor in the training device may perform model training to obtain the perception network described in FIG. 6.

An embodiment of this disclosure further provides a computer program product. When the computer program product is run on a computer, the computer is enabled to perform steps performed by the execution device or steps performed by the training device.

An embodiment of this disclosure further provides a computer-readable storage medium. The computer-readable storage medium stores a program used for signal processing. When the program is run on a computer, the computer is enabled to perform steps performed by the execution device or steps performed by the training device.

The execution device, the training device, or the terminal device in embodiments of this disclosure may be specifically a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the execution device performs the data processing method described in the foregoing embodiments, or a chip in the training device performs the data processing method described in the embodiments. Optionally, the storage unit is a storage unit in the chip, for example, a register or a buffer. Alternatively, the storage unit may be a storage unit in a wireless access device but outside the chip, for example, a read-only memory (ROM), another type of static storage device that can store static information and instructions, or a random access memory (RAM).

Figure 18:
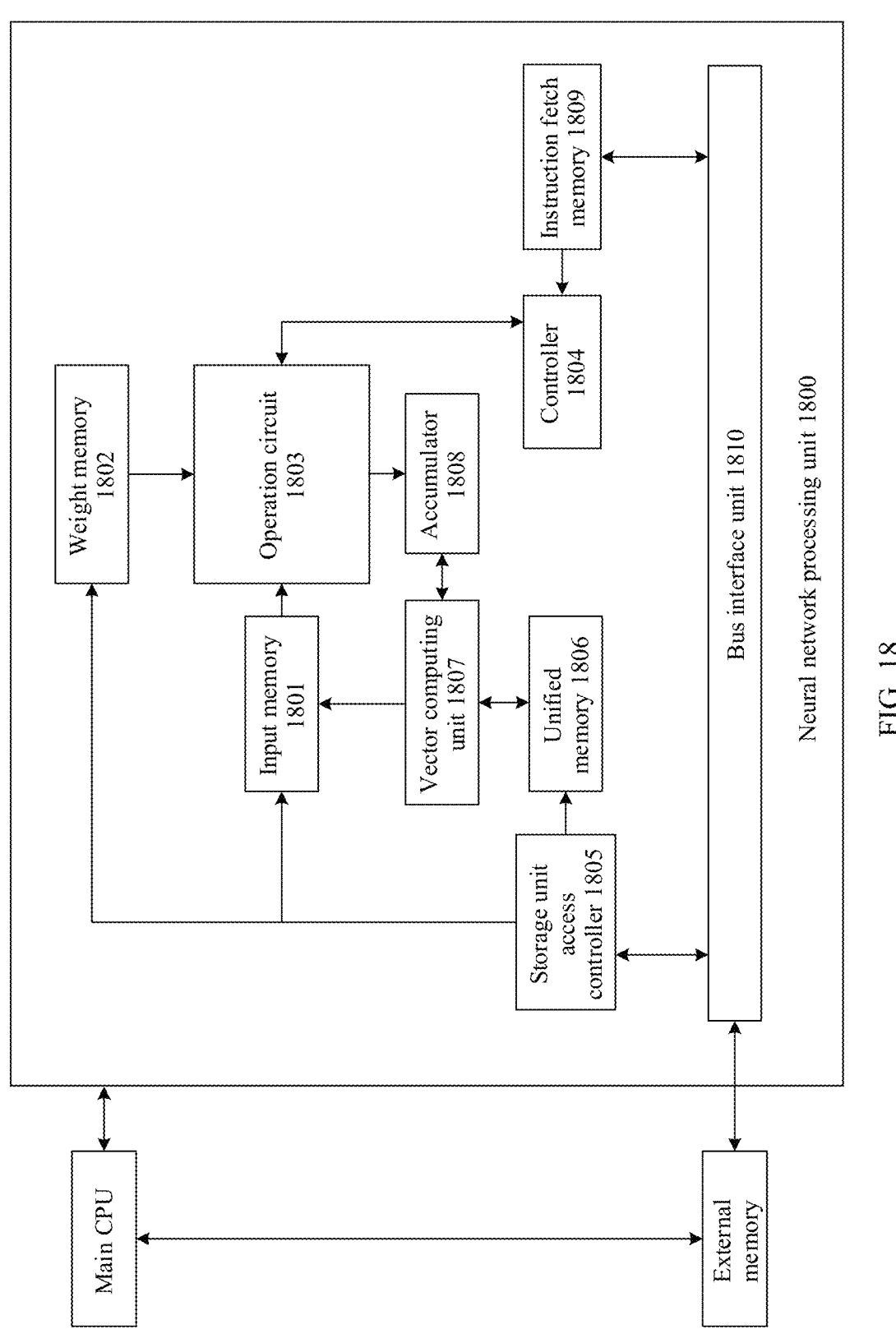
FIG. 18 is a schematic diagram of a structure of a chip according to an embodiment of this disclosure.

Specifically, FIG. 18 is a schematic diagram of a structure of a chip according to an embodiment of this disclosure. The chip may be represented as a neural network processing unit NPU 1800. The NPU 1800 is mounted on a host CPU as a coprocessor, and the host CPU allocates a task. A core part of the NPU is an operation circuit 1803, and a controller 1804 controls the operation circuit 1803 to extract matrix data in a memory and perform a multiplication operation.

The NPU 1800 may implement, through cooperation between internal components, the data processing method provided in the embodiment described in FIG. 4, or infer a model obtained through training.

The operation circuit 1803 in the NPU 1800 may perform steps of obtaining a first neural network model and performing model training on the first neural network model.

More specifically, in some implementations, the operation circuit 1803 in the NPU 1800 includes a plurality of processing units (PE). In some implementations, the operation circuit 1803 is a two-dimensional systolic array. The operation circuit 1803 may alternatively be a one-dimensional systolic array or another electronic circuit that can perform mathematical operations such as multiplication and addition. In some implementations, the operation circuit 1803 is a general-purpose matrix processor.

For example, it is assumed that there is an input matrix A, a weight matrix B, and an output matrix C. The operation circuit fetches, from a weight memory 1802, data corresponding to the matrix B, and caches the data on each PE in the operation circuit. The operation circuit fetches data of the matrix A from an input memory 1801, to perform a matrix operation on the matrix B, and stores an obtained partial result or an obtained final result of the matrix in an accumulator 1808.

A unified memory 1806 is configured to store input data and output data. Weight data is directly transferred to the weight memory 1802 by using a storage unit access controller (DMAC) 1805. The input data is also transferred to the unified memory 1806 by using the DMAC.

A BIU is a bus interface unit, that is, a bus interface unit 1810, configured to interact with the DMAC and an instruction fetch buffer (IFB) 1809 through an AXI bus.

The bus interface unit 1810 (BIU for short) is configured for the instruction fetch buffer 1809 to obtain an instruction from an external memory, and is further configured for the direct memory access controller 1805 to obtain original data of the input matrix A or the weight matrix B from the external memory.

The DMAC is mainly configured to transfer input data in the external memory DDR to the unified memory 1806, or transfer the weight data to the weight memory 1802, or transfer the input data to the input memory 1801.

A vector computing unit 1807 includes a plurality of operation processing units. If required, further processing is performed on an output of the operation circuit 1803, for example, vector multiplication, vector addition, an exponential operation, a logarithmic operation, or a value comparison. The vector computing unit 1807 is mainly configured to perform network computation at a non-convolutional/fully connected layer of a neural network, for example, batch normalization, pixel-level summation, and upsampling on a feature plane.

In some implementations, the vector computing unit 1807 can store a processed output vector in the unified memory 1806. For example, the vector computing unit 1807 may apply a linear function or a non-linear function to an output of the operation circuit 1803, for example, perform linear interpolation on a feature plane extracted at a convolutional layer. For another example, the linear function or the non-linear function is applied to a vector of an accumulated value to generate an activation value. In some implementations, the vector computing unit 1807 generates a normalized value, a pixel-level sum, or a normalized value and a pixel-level sum. In some implementations, the processed output vector can be used as an activation input into the operation circuit 1803, for example, to be used at a subsequent layer of the neural network.

The instruction fetch buffer 1809 connected to the controller 1804 is configured to store instructions used by the controller 1804.

The unified memory 1806, the input memory 1801, the weight memory 1802, and the instruction fetch buffer 1809 are all on-chip memories. The external memory is private for a hardware architecture of the NPU.

The processor mentioned above may be a general-purpose central processing unit, a microprocessor, an ASIC, or one or more integrated circuits for controlling program execution.

In addition, it should be noted that the apparatus embodiments described above are merely an example. The units described as separate parts may or may not be physically separate, and parts displayed as units may or may not be physical units, may be located in one place, or may be distributed on a plurality of network units. Some or all of the modules may be selected based on an actual requirement, to achieve objectives of the solutions in embodiments. In addition, in the accompanying drawings of the apparatus embodiments provided in this disclosure, a connection relationship between modules indicates that the modules have a communication connection with each other, and may be specifically implemented as one or more communication buses or signal cables.

Based on the description of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this disclosure, a software program implementation is a better implementation in most cases. Based on such an understanding, the technical solutions of this disclosure essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this disclosure.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some procedures or functions in embodiments of this disclosure are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from one website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, for example, a training device or a data center in which one or more usable media are integrated. The usable medium may be a magnetic medium (for example, a floppy disk, a hard disk, or a magnetic tape), an optical medium (for example, a DVD), a semiconductor medium (for example, a solid state disk (SSD)), or the like.

The invention claimed is:

1. A data processing method implemented by a feature extraction network, wherein the method comprises:
   performing convolution processing on input data to obtain M target feature maps;
   performing convolution processing on M1 target feature maps in the M target feature maps to obtain M1 first feature maps, wherein M1 is less than M;

processing M2 target feature maps in the M target feature maps to obtain M2 second feature maps, wherein M2 is less than M; and concatenating the M1 first feature maps and the M2 second feature maps to obtain a concatenated feature map;

fusing the feature map output by each second block by using a fusion operation, to obtain a fused feature map, wherein a size of the fused feature map is same as a size of the M2 second feature maps; and performing an addition operation on the fused feature map and the M2 second feature maps, to obtain processed M2 second feature maps, wherein the concatenating the M1 first feature maps and the M2 second feature maps comprises: concatenating the M1 first feature maps and the processed M2 second feature maps, to obtain the concatenated feature map;

wherein the feature extraction network is configured to:

obtain an input image;

perform feature extraction on the input image; and output a feature map of the input image;

wherein the method further comprises:

processing a corresponding task based on the feature map of the input image by using a task network to obtain a processing result.

2. The method according to claim 1, wherein the feature extraction network comprises a first block, at least one second block connected in series, a target operation, and a concatenation operation, wherein the input data is input of the first block, the M target feature maps are outputs of the first block and input of at least one second block, the M1 first feature maps are output of at least one second block and inputs of the target operation's input.

3. The method according to claim 2, wherein the first block and M second blocks are blocks in a same stage in the feature extraction network.

4. The method according to claim 2, wherein a quantity of parameters of the target operation is less than a quantity of parameters of the M second blocks.

5. The method according to claim 2, wherein the target operation is a convolution operation whose quantity of parameters is less than a quantity of parameters of the at least one second block; or the target operation is a residual connection operation between an output of the first block and an output of the concatenation operation.

6. The method according to claim 2, wherein an output of a second block that is farthest from the first block in the at least one second block is the M1 first feature maps.

7. The method according to claim 1, wherein the fusing the feature map output by each second block by using a fusion operation comprises:

performing concatenation and dimension reduction operations on an output of each second block by using the fusion operation, to obtain the fused feature map whose size is same as the size of the M2 second feature maps.

8. The method according to claim 2, wherein the first block and the M second blocks are blocks in a target stage in the feature extraction network, and the concatenated feature map is used as an output feature map of the target stage in the feature extraction network; and wherein the method further comprising:

performing a convolution operation on the concatenated feature map to obtain an output feature map of the target stage.

9. The method according to claim 1, wherein the task comprises target detection, image segmentation, or image classification.

10. A data processing apparatus applied in a feature extraction network, wherein the apparatus comprises a memory and at least one processor, the memory stores instructions for execution by the at least one processor to perform operations comprising:

performing convolution processing on input data to obtain M target feature maps;

performing convolution processing on M1 target feature maps in the M target feature maps to obtain M1 first feature maps, wherein M1 is less than M;

processing M2 target feature maps in the M target feature maps to obtain M2 second feature maps, wherein M2 is less than M; and concatenating the M1 first feature maps and the M2 second feature maps to obtain a concatenated feature map;

fusing the feature map output by each second block by using a fusion operation, to obtain a fused feature map, wherein a size of the fused feature map is same as a size of the M2 second feature maps; and performing an addition operation on the fused feature map and the M2 second feature maps, to obtain processed M2 second feature maps, wherein the concatenating the M1 first feature maps and the M2 second feature maps comprises:

concatenating the M1 first feature maps and the processed M2 second feature maps, to obtain the concatenated feature map;

wherein the feature extraction network is configured to:

obtain an input image;

perform feature extraction on the input image; and output a feature map of the input image;

wherein the method further comprises:

processing a corresponding task based on the feature map of the input image by using a task network to obtain a processing result.

11. The data processing apparatus according to claim 10, wherein the feature extraction network comprises a first block, at least one second block connected in series, a target operation, and a concatenation operation, wherein the input data is input of the first block, the M target feature maps are outputs of the first block and input of at least one second block, the M1 first feature maps are output of at least one second block and inputs of the target operation's input.

12. The data processing apparatus according to claim 11, wherein the first block and M second blocks are blocks in a same stage in the feature extraction network.

13. The method according to claim 1, wherein an intersection set of the M1 target feature maps and the M2 target feature maps is empty, a sum of M1 and M2 is M, and a quantity of channels of the concatenated feature map is M.

14. The data processing apparatus according to claim 11, wherein a quantity of parameters of the target operation is less than a quantity of parameters of the M second blocks.

15. The data processing apparatus according to claim 11, wherein the target operation is a convolution operation whose quantity of parameters is less than a quantity of parameters of the at least one second block; or the target operation is a residual connection operation between an output of the first block and an output of the concatenation operation.

16. The data processing apparatus according to claim 11, wherein an output of a second block that is farthest from the first block in the at least one second block is the M1 first feature maps.

17. The data processing apparatus according to claim 10, wherein the fusing the feature map output by each second block by using a fusion operation comprises:

performing concatenation and dimension reduction operations on an output of each second block by using the fusion operation, to obtain the fused feature map whose size is same as the size of the M2 second feature maps.

18. The data processing apparatus according to claim 11, wherein the first block and the M second blocks are blocks in a target stage in the feature extraction network, and the concatenated feature map is used as an output feature map of the target stage in the feature extraction network; and wherein the operations further comprising: performing a convolution operation on the concatenated feature map, to obtain an output feature map of the target stage.

19. The data processing apparatus according to claim 10, wherein an intersection set of the M1 target feature maps and the M2 target feature maps is empty, a sum of M1 and M2 is M, and a quantity of channels of the concatenated feature map is M.

20. A non-transitory computer storage medium applied in a feature extraction network, wherein the computer storage medium stores one or more instructions, and when the instructions are executed by one or more computers, the one or more computers run operations comprising:

performing convolution processing on input data to obtain M target feature maps;

performing convolution processing on M1 target feature maps in the M target feature maps to obtain M1 first feature maps, wherein M1 is less than M; processing M2 target feature maps in the M target feature maps to obtain M2 second feature maps, wherein M2 is less than M; and concatenating the M1 first feature maps and the M2 second feature maps to obtain a concatenated feature map;

fusing the feature map output by each second block by using a fusion operation, to obtain a fused feature map, wherein a size of the fused feature map is same as a size of the M2 second feature maps; and performing an addition operation on the fused feature map and the M2 second feature maps, to obtain processed M2 second feature maps, wherein the concatenating the M1 first feature maps and the M2 second feature maps comprises:

concatenating the M1 first feature maps and the processed M2 second feature maps, to obtain the concatenated feature map;

wherein the feature extraction network is configured to:

obtain an input image;

perform feature extraction on the input image; and output a feature map of the input image;

wherein the method further comprises:

processing a corresponding task based on the feature map of the input image by using a task network to obtain a processing result.

21. The non-transitory computer storage medium according to claim 20, wherein the feature extraction network comprises a first block, at least one second block connected in series, a target operation, and a concatenation operation, wherein the input data is input of the first block, the M target feature maps are outputs of the first block and input of at least one second block, the M1 first feature maps are output of at least one second block and inputs of the target operation's input.

\* \* \* \* \*